(12) United States Patent
Verheijen et al.

(10) Patent No.: US 11,926,328 B2
(45) Date of Patent: Mar. 12, 2024

(54) TIRE SELECTION METHODS AND SYSTEMS UTILIZING DRIVING DATA RELATING TO THE DRIVING OF AN ASSOCIATED VEHICLE

(71) Applicants: Webfleet Solutions B.V., Amsterdam (NL); Bridgestone Europe NV/SA, Zaventem (BE)

(72) Inventors: Paul Roeland Verheijen, Amsterdam (NL); Valerio Bortolotto, Rome (IT); Roberto Benedetti, Rome (IT); Federico Tecca, Rome (IT); Jeroen Lust, Zaventem (BE); Jonathan Alcantarilla Calderon, Zaventem (BE)

( * ) Notice: Subject to any disclaimer, the term of this patent is extended or adjusted under 35 U.S.C. 154(b) by 170 days.

(21) Appl. No.: 17/367,613

(22) Filed: Jul. 5, 2021

(65) Prior Publication Data

US 2022/0001879 A1    Jan. 6, 2022

(30) Foreign Application Priority Data

Jul. 3, 2020  (EP) .................................. 20184082

(51) Int. Cl.
  *B60W 40/09*  (2012.01)
(52) U.S. Cl.
  CPC ......... *B60W 40/09* (2013.01); *B60W 2530/20* (2013.01); *B60W 2552/05* (2020.02)
(58) Field of Classification Search
  CPC ............. B60W 40/09; B60W 2552/05; B60W 2530/20
  See application file for complete search history.

(56) References Cited

U.S. PATENT DOCUMENTS

2005/0080777 A1   4/2005  Champeau
2009/0143937 A1*  6/2009  Craig ................... B60W 40/02
                                                         701/37
(Continued)

FOREIGN PATENT DOCUMENTS

DE    102009003789 A1   10/2010
DE    102016200623 A1    7/2017
(Continued)

OTHER PUBLICATIONS

International Search Authority: European Patent Office extended search report for corresponding Application No. EP 21 18 3824 dated Oct. 7, 2021 17 pages.
(Continued)

*Primary Examiner* — Ramsey Refai
(74) *Attorney, Agent, or Firm* — Patterson Intellectual Property Law, PC

(57) ABSTRACT

There is disclosed a method, for determining a suitable tire for use on a vehicle, wherein the vehicle comprises an electronic device capable of collecting driving data relating to the driving of the vehicle. The method comprises obtaining driving data (18), from the electronic device, relating to the driving of the vehicle, and determining, from the driving data, an amount of driving performed on at least one of a plurality of different road types (20). The method further comprises forming a road type driving profile (22) comprising one or more road types and the associated determined amount of driving performed thereon and selecting, from a plurality of different tires, a suitable tire (24) for the vehicle based on at least the road type driving profile.

18 Claims, 10 Drawing Sheets

(56) References Cited

U.S. PATENT DOCUMENTS

| | | |
|---|---|---|
| 2010/0060443 A1 | 3/2010 | Wakeo et al. |
| 2010/0241307 A1 | 9/2010 | Hara |
| 2013/0262363 A1* | 10/2013 | Kimura .................. G06N 5/02 |
| | | 706/46 |
| 2014/0052566 A1 | 2/2014 | Neidert et al. |
| 2014/0067599 A1 | 3/2014 | Gokyu et al. |
| 2014/0279707 A1 | 9/2014 | Joshua et al. |
| 2017/0023441 A1 | 1/2017 | Luk et al. |
| 2017/0132586 A1 | 5/2017 | Kolton et al. |
| 2018/0365752 A1* | 12/2018 | Wilson .................. G06N 5/048 |
| 2019/0265129 A1 | 8/2019 | Tamura et al. |
| 2020/0090419 A1* | 3/2020 | Rajkumar ................ G06N 5/02 |
| 2021/0061021 A1* | 3/2021 | Singh ..................... H04L 12/40 |

FOREIGN PATENT DOCUMENTS

| | | |
|---|---|---|
| EP | 2653322 A1 | 10/2013 |
| EP | 2705962 A1 | 3/2014 |
| EP | 2123487 B1 | 7/2015 |
| EP | 3470244 B1 | 6/2021 |
| JP | 2002222361 A | 8/2002 |
| JP | 2002277353 A | 9/2002 |
| JP | 2003178219 A | 6/2003 |
| JP | 2016051311 A | 4/2016 |
| KR | 20000050157 A | 8/2000 |
| KR | 101425019 B1 | 8/2014 |
| KR | 1020170050051 A | 5/2017 |
| WO | 2003076215 A1 | 9/2003 |
| WO | 2009047975 A1 | 4/2009 |
| WO | 2014159127 A1 | 10/2014 |
| WO | 2015134372 A1 | 11/2015 |
| WO | 2016122881 A1 | 8/2016 |
| WO | 2021094279 A1 | 5/2021 |

OTHER PUBLICATIONS

European Patent Office Action for corresponding Application No. 21 183 824.8-1012 dated Feb. 15, 2023, 7 pages.

International Search Report: European Search Report for corresponding Application No. EP20184082 dated Sep. 23, 2020, 28 pages.

* cited by examiner

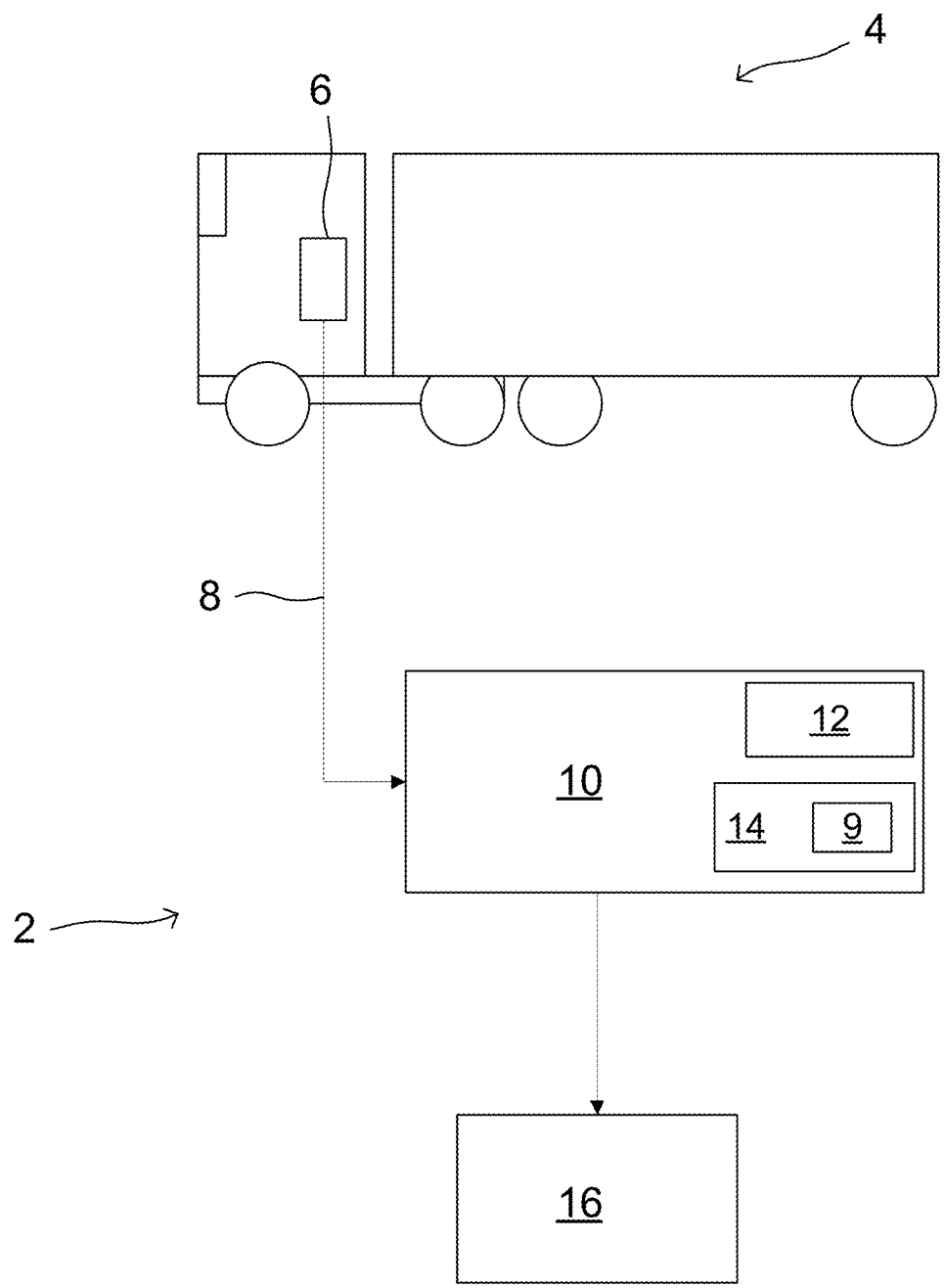

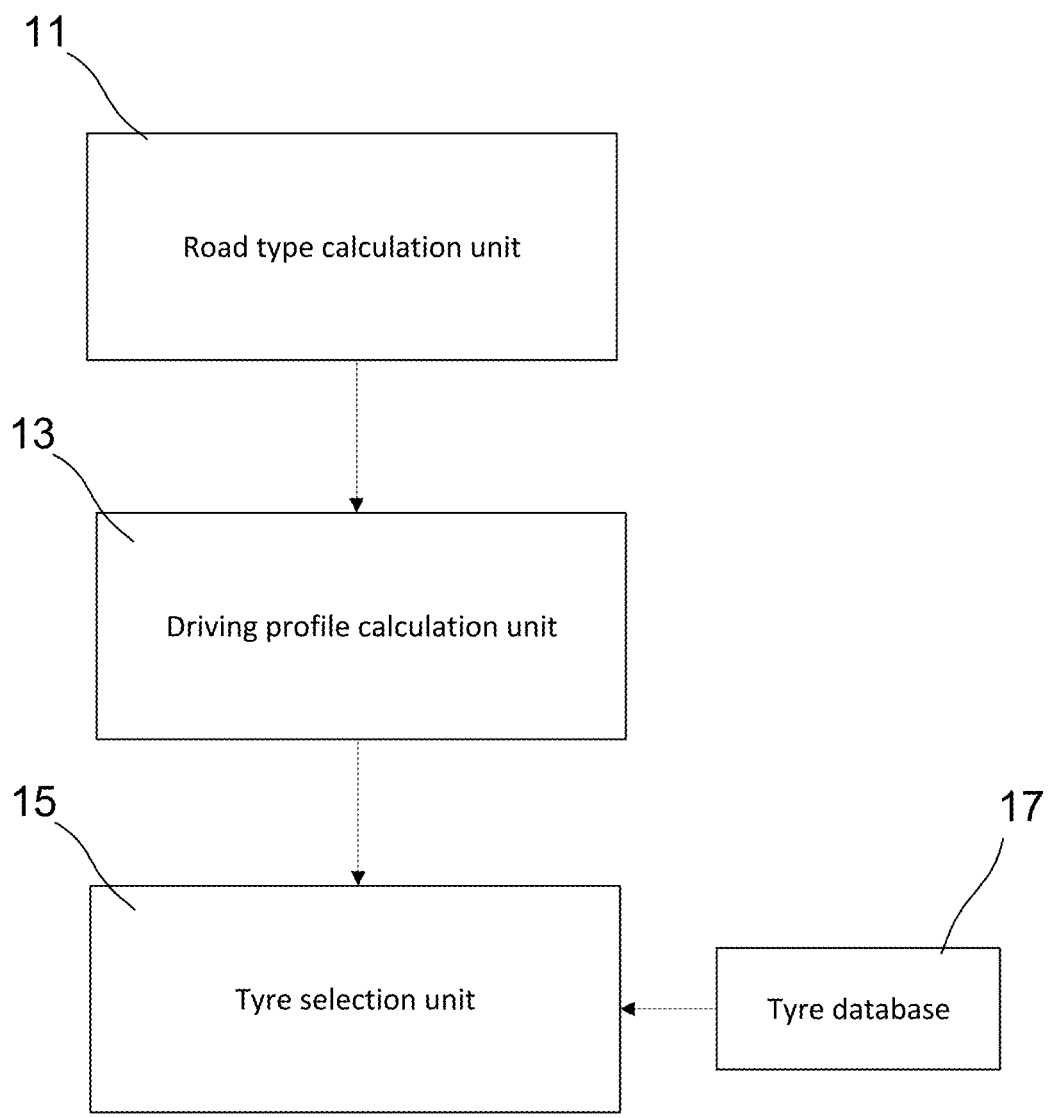

Fig. 5

| Tyre Type | Optimal Road Type | Minimum driving proportion on optimal road type | Minimum Average Speed (km/h) | Average minimum number of Gear Shifts per hour |
|---|---|---|---|---|
| Tyre 1 | Highway | 70% | 65 | 20 |
| Tyre 2 | Highway | 70% | 50 | 10 |
| Tyre 3 | Extra urban | 60% | 20 | 40 |
| Tyre 4 | Extra urban | 60% | 40 | 50 |
| Tyre 5 | Urban | 80% | 20 | 70 |
| Tyre 6 | Mixed | N/A | 15 | 80 |

Fig. 11

| Positional information | Damage Factor | Wear Factor |
|---|---|---|
| Location 1 | 1 | 1 |
| Location 2 | 10 | 7 |
| Location 3 | 3 | 3 |

Fig. 12

| Location | Environmental Conditions | |
|---|---|---|
| | Average Temperature (°C) | Average Weather condition |
| Location 1 | 23 | Dry |
| Location 2 | 18 | Dry |
| Locaiton 3 | 15 | Rain |
| Location 4 | 29 | Dry |

Fig. 13

| Location | Tyre regulation - winter tyre required? |
|---|---|
| United Kingdom | No |
| Germany | Yes |
| France | No |
| Belgium | No |
| Austria | Yes |
| Norway | Yes |

Fig. 14

| Vehicle X | Specification |
|---|---|
| Type | Truck |
| Use | Goods transport |
| Unladen Weight | 5 tonne |
| Maximum Laden Weight | 20 tonnes |
| Maximum Speed | 56 mph |

TIRE SELECTION METHODS AND SYSTEMS UTILIZING DRIVING DATA RELATING TO THE DRIVING OF AN ASSOCIATED VEHICLE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: European Patent Application No. EP 20184082.4 filed Jul. 3, 2020 entitled "Tyre Selection Methods and Systems."

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Technical Field

The present invention relates to a method, a server and a system for determining a tire suitable for use on a vehicle.

Tires are often designed for predominant use on a particular road type and for use with a particular type of vehicle. For example, tires may be manufactured from materials having properties making them particularly suitable for use on specific road type. Additionally, or alternatively, tires may be manufactured having a tread pattern which is particularly well suited for use on a specific road type. Use of the most suitable tire can have a number of benefits, including, for example, improved fuel efficiency and increased lifespan of the tire. When deciding on the type of tire to be used on a particular vehicle, prior art techniques typically involve making a judgement as to the expected driving which will be performed by the vehicle. Based on this judgement a tire may be recommended. Considering the example of a heavy-haulage lorry, it may be expected that the lorry will predominantly drive on highways, and thus a tire suitable for use on highways will be recommended.

The expected driving of a particular vehicle may not always correspond to the vehicle's actual driving, and thus in some instances the most suitable tire may not be recommended. For example, whilst it may be expected that a lorry will drive predominantly on highways, if the lorry is instead used for deliveries in an urban area, the lorry may instead be driven predominantly on urban roads. Accordingly, prior art techniques may result in the recommendation of a tire which is not best suited to the vehicle's actual use. This may result in a reduction in fuel economy and/or a reduction in the lifespan of the chosen tire.

Accordingly, there remains a need for improved ways to select tires for vehicles.

BRIEF SUMMARY OF THE INVENTION

According to a first aspect of the present invention, there is provided a method, for determining a suitable tire for use on a vehicle, wherein the vehicle comprises an electronic device capable of collecting driving data relating to the driving of the vehicle, the method comprising:

obtaining (e.g. by a server device) driving data, from the electronic device, relating to the driving of the vehicle;

determining (e.g. by the server device), from the driving data, an amount of driving performed on at least one of a plurality of different road types;

forming (e.g. by the server device) a road type driving profile comprising one or more road types of the plurality of different road types and the associated determined amount of driving performed thereon; and selecting (e.g. by the server device or another device), from a plurality of different tires, a suitable tire for the vehicle based on at least the road type driving profile.

It will be appreciated that in this method, using the driving data obtained from the electronic device of the vehicle, it is possible to determine or calculate the actual amount of driving a vehicle performs on one or more road types and then form a road type driving profile. Based on the road type driving profile, it is then possible to select, i.e. recommend, a suitable tire for the vehicle. Accordingly, the method of the present invention utilizes actual driving data relating to the driving of the vehicle to form a road type profile to inform the selecting of a suitable tire for use on the vehicle. As a result, a tire can be selected based on the actual driving of the vehicle, rather than just expected driving according to prior art techniques. The method may thus result in the selection of a tire which is most suitable for the actual type of driving which will be performed by the vehicle. This may, for example, improve the fuel efficiency of the vehicle and also potentially increase the longevity of the tires on the vehicle. Additionally, it may also mean that the safest tire is selected for the vehicle, as the tire may be particularly suitable for certain types of handling maneuvers or braking profiles which are expected based on the type of driving performed by the vehicle. Selecting the tire may comprise selecting a tire from a database comprising a plurality of different tires. The database may comprise a plurality of different tires and respective tire information. The tire information may comprise any relevant information which can be used to inform a selection of a particular tire. The tire information for each tire in the database may, for example, comprise at least one of: a suitability for use on different road type driving profiles, its durability, its suitability for use on particular surfaces, its maximum load etc. The method described herein may be a computer-implemented method which be performed by any suitable computer.

The step of selecting a suitable tire for the vehicle based on at least the road type driving profile may involve calculating which tire is suitable for the vehicle. Selecting the tire does not necessarily require a physical selection of the tire. For example, the selected tire may be displayed, e.g. on a display device, to a fleet manager who decides which tires are fitted to a vehicle. The fleet manager may then decide whether or not to recommend that the selected tire is fitted to a particular vehicle.

In the exemplary case of driving data obtained from an electronic device of a lorry, the amount of driving determined to be performed on a highway, for example, may be significantly larger than the amount of driving performed on other road types. The road type driving profile will reflect this increased amount of driving on highways and thus a tire, known to be particularly suitable for predominant use on highways, may then be selected. Considering a different lorry, which according to prior art techniques would be expected to be predominantly driven on highways, when analyzing the actual driving data obtained from the lorry in accordance with the method described above, a road type driving profile may be formed in which driving is performed predominantly on urban roads. In this case, a tire suitable for predominant use on urban roads may be selected. This is contrasted to prior art techniques which may have inappropriately recommended a tire suitable for use on highways. The method according to the present invention may thus be used to more accurately select a tire which is suitable for the actual type of driving performed by the vehicle.

The road type driving profile may comprise any information which can be derived from the amount of driving performed on each road type. For example, the road type driving profile may comprise a breakdown of each road type and the distance driven on each road type. It may also optionally include the time driven on each road type. Further, it may optionally include the proportion, based on distance and/or time, driven on each road type. For example, it may be determined that 60% of the total distance was driven on highways, 20% was driven on extra-urban roads, and 10% was performed on urban roads. Any, or all, of this information may be used to select a tire suitable for use on the vehicle.

The road types which the driving is associated with may, for example, depend on the type of driving data which is analyzed, the availability of other data for categorizing the road types, and/or the types of road for which the tires are known to be suitable for. In some examples, the method may determine an amount of driving performed on one road type of most interest, e.g. so that the road type driving profile can simply be used to assess whether the amount of driving on the road type of interest is above or below a threshold. In some other examples, the method may determine an amount of driving performed on each of a plurality of different road types. For example, in the case of positional data, a map database used may contain road categorizations for three different road types. Similarly, if each of the plurality of tires available for selection are known to be suitable for five different road types, the amount of driving performed may be determined for each of the five different road types so as to facilitate the selection of the most appropriate tire. In a set of embodiments, the plurality of different road types includes: paved roads and natural surface roads. Roads may be defined as a line of communication (a travelled way) open to public traffic, primarily for the use of road motor vehicles, using a stabilized base other than rails or air strips. Roads which may be included are paved roads and other roads with a stabilized base, e.g. gravel roads. Roads also cover streets, bridges, tunnels, supporting structures, junctions, crossings and interchanges. Toll roads may also be included. Dedicated cycle lanes may be excluded. In some embodiments, the plurality of different road types includes: highways, extra-urban roads and urban roads. Of course any other suitable road type may also be included. Certain road types may include other sub-categories of road types such that road types are grouped together. For example, urban roads may include city roads and any smaller roads.

In determining the amount of driving performed on one or more of the plurality of different road types, a number of different factors may be considered. In some embodiments, the amount of driving performed on one or more of the plurality of different road types is determined based on at least the time spent driving on each road type and/or the distance driven on each road type.

The step of selecting the tire based on at least the road type driving profile may include consideration of a number of different factors which may require detailed analysis of the road type driving profile in order to select a suitable tire. In a set of embodiments, selecting the suitable tire comprises selecting a tire from a tire database in which each of the plurality of tires is known for predominant use on one or more particular road types. The database may comprise a number of different tires and their recommended predominant road type usage(s). For example, one tire in the database may be known to be suitable for predominant use on highways, one tire may be known to be suitable for use on extra-urban roads, one tire may be known to be suitable for predominant use on urban roads, and one tire may be known for use on a mix of different road types. Accordingly, the selecting of the tire may comprise determining the predominant road type driven on from the road type driving profile, and the selection of a tire which is suitable for use on that road type. What is determined to be 'predominant' may be different for each individual tire type.

The driving data may comprise any data which allows a determination of the amount of driving performed on each road type. For example, the driving data may include the vehicle's speed, e.g. the instantaneous or average speed, at various points throughout its trip(s). It may be possible to determine the road types driven on by the vehicle from the vehicle's speed. For example, on portions of the driving when the vehicle is at 60 km/h (or above) it may be determined that the vehicle is driving on a highway. The same logic may be applied for different road types and also in a similar manner for different vehicles. Such determinations may be country-specific e.g. based on legal speed limits.

However, other data, such as positional data, may be used to determine the amount of driving performed on each road type. Accordingly, in a set of embodiments, the driving data comprises positional data relating to the driving of the vehicle, and wherein the method further comprises using the positional data to determine the amount of driving performed on at least one of the plurality of different road types. The positional data may comprise the actual positions of the vehicle. For example, each data point within the positional data may comprise an actual position of the vehicle, and the positional data may comprise a plurality of such data points. The use of positional data may provide a simple and accurate means for determining the one or more road types driven on by the vehicle. The amount of driving performed on at least one of the plurality of different road types may be determined using the positional data in any suitable manner. For example, a road type database may comprise electronic map data including positions and their associated road type. The method may thus determine an amount of driving performed on at least one of the plurality of road types by matching the positional data to positions and their associated road types in the road type database.

In a set of embodiments, the driving data comprises positional data relating to the driving of the vehicle and the method further comprises matching the positional data to map data, representing a road network and including a road type designation for each road segment in the road network, to determine the one or more road types driven on by the vehicle. Through matching the positional data to map data, the amount of driving performed on at least one road type may be quickly and easily determined. As mentioned above, the road types which are available may depend on the map data available and may be specific to the provider of the map data. Again, the road types may vary from one country to another.

The road type profile on which the vehicle is driven may not be the only information which can be used to select a suitable tire for use on the vehicle. Other information relating to the driving of the vehicle, and/or relating to the vehicle itself, may also assist in the selection of a suitable tire. Thus, in a set of embodiments, the driving data comprises positional data and wherein the method further comprises determining, using the positional data, a damage factor and/or wear factor for the vehicle, and wherein selecting a suitable tire for the vehicle is also based on the damage factor and/or wear factor. As will be appreciated, the damage factor may be indicative of the likelihood of potential damage to the tires on the vehicle based on the positional data for the vehicle. The wear factor may be indicative of the expected wear to the tires on the vehicle based on the positional data for the vehicle. The use of the actual positional data of the vehicle may allow an accurate damage and/or wear factor to be determined and thus a most suitable tire may then be selected. Additionally, by using the actual positional data, it may be possible to capture all of the different positions, i.e. locations/places/surfaces, in/on which the vehicle is driven, and thus the damage and/or wear factor may be representative for all of the driving performed by the vehicle. This may be contrasted to prior art techniques for selecting tires whereby an estimate may be made for the type of driving performed by a vehicle, which may not necessarily accurately reflect the actual driving performed.

Taking into account the damage factor when selecting the tire for the vehicle, may advantageously ensure that a tire is selected which is capable of withstanding potential damage that may occur to the vehicle. For example, as may be determined from the positional data, the vehicle may be used in locations whereby there is an increased likelihood of damage to the tires occurring. The damage factor may, at least partially, be dependent on (i.e. defined by) characteristics of the driving surface at a particular position/location. For example, the positional data may indicate that the vehicle is frequently driven on natural surface roads, e.g. on off-road surfaces such as on stone quarry roads, whereby there is a greater risk of tire damage. In this exemplary case, a tire which is capable of withstanding higher levels of damage may be selected. This may be contrasted to a vehicle which is predominantly driven on roads having a paved surface, whereby the likelihood of damage may be less. In this instance, the damage factor may be less than the damage factor for natural surface roads. Tire damage may, for example, include cuts and punctures. The damage factor may have any suitable form that can be used in the step of selecting the suitable tire. For example, the damage factor may be on a number scale, and the plurality of tires may have associated damage factors. Therefore, by determining the damage factor for the vehicle, it may be possible to select a tire having a corresponding damage factor. Of course, the damage factor may have any suitable form and be used in any suitable manner in selecting the suitable tire.

The damage factor for the vehicle may, for example, be at least partially defined by the road type on which the vehicle is driven and may also be weighted based on a general quality of roads in a particular location, e.g. country. For example, taking the case of a first country and a second country, for a particular road type in both countries, the damage factor may be weighted in accordance with the quality of the roads in each country. For example, the first country may have poorer quality roads and therefore potentially cause higher levels of damage. As such, the damage factor for roads in the first country may be weighted to reflect this. For example, in the first country, a particular road type may cause a 10% increase in the level of damage when compared to the same road type in second country. In using the positional data to determine the damage factor for the vehicle, the damage factor may be an average of the damage factors for the various positions, e.g. locations, at which the vehicle is driven. This may be considered to be a form of averaging which takes into account that in certain locations the damage factor may be different than in other locations. In the exemplary case of the two vehicles above, a ratio of the amount of driving on each road type in the respective countries may be determined, and this ratio may be taken into account when determining a damage factor for the vehicle indicative of its overall driving.

Similarly, taking into account the wear factor when selecting a tire for use on the vehicle may advantageously ensure that a tire is selected which is suitable for the expected wear of the tire on the vehicle. This may help to ensure that a tire is selected for the vehicle which is capable of withstanding the expected wear, thereby potentially avoiding early tire changes, which would otherwise cause unwanted downtime for the vehicle. As with the damage factor, using the positional data, it may be possible to determine a wear factor for the vehicle. Similarly to the example above in respect of the damage factor, the tires on a vehicle may experience more wear when driven on natural road surfaces, when compared to paved surfaces. As such, the wear factor may be larger for natural road surfaces, when compared the wear factor for paved surfaces. The wear factor may therefore, at least partially, be determined (i.e. defined) by characteristics of the driving surface at a particular position/location. Thus, by using the positional data to determine a wear factor, and then taking into account this wear factor when selecting the tire suitable for use on the vehicle, a tire which has an appropriate wear profile may be selected for the vehicle, thereby minimizing premature tire changes. As discussed above with regard to the damage factor, the wear factor may similarly be determined based on the driving of the vehicle and be defined based on an average of the wear factor for at least some, e.g. all, of the positions at which the vehicle is driven.

Similarly to the damage factor, the wear factor may have any suitable form. For example, the wear factor may comprise a number on a scale, and the plurality of tires may have associated wear factors. A higher wear factor may be indicative of an increased amount of wear on the tires on a vehicle. In determining the wear factor for the vehicle, it may be possible to select a tire having a corresponding wear factor. Of course, the wear factor may have any other suitable form and be used in any suitable manner in selecting the suitable tire.

The step of determining the damage factor and/or the wear factor may, for example, comprise using a damage and/or wear factor database comprising positional information and associated damage and/or wear factors, and matching the positional data to position information in the database to determine the damage and/or wear factors for the vehicle. The positional information in the database may comprises associated damage and/or wear factors. As mentioned previously, the damage and/or wear factors may be defined by the characteristics of the road surface at the particular positions in the database. As such, particular roads, e.g. particular road types, road surfaces, and areas may have associated damage and/or wear factors. For example, for positional information corresponding to a rough road, e.g. a natural road surface, the damage and/or wear factors may be higher, i.e. indicative of increased likelihood of damage and wear, when compared to a smoother road, e.g. a paved surface. Additionally, similar road surfaces may have different damage and/or wear factors. For example, a particular area or road may have a larger number of road imperfections, e.g. potholes, when compared to another area or road. As such, the area or road with the larger number of imperfections may have a higher damage and/or wear factor. The damage factor and/or wear factor for the vehicle may be determined based on an average of the associated damage factor and/or wear factor for at least a portion, e.g. all, of the positions within position data. The damage factor and/or wear factor of the vehicle may thus be considered to be an overall damage factor and/or an overall wear factor for the vehicle, determined using the individual damage and/or wear factors stored in the database for specific positions stored therein.

Whilst it is described above how the damage factor and/or wear factor may be determined using the positional data, the damage factor and/or wear factor may be determined using other data obtained from the electronic device. For example, the method may instead use accelerometer data obtained from an accelerometer on the electronic device fitted to the vehicle. Accelerometer data may be indicative of the conditions on which the vehicle is driven. For example, it may be possible to determine, from the accelerometer data, that the vehicle is driven over rough roads, or roads with imperfections, e.g. potholes, which may increase the damage and wear of the tires of the vehicle. Accordingly, other data, such as accelerometer data may instead be used to determine the damage factor and/or wear factor.

In a set of embodiments, the driving data comprises positional data, and the method further comprises determining, using the positional data, a predicted tire change point at which at least one tire on the vehicle should be replaced. The tire change point may be defined in any suitable manner. For example, it may be defined as a specific point of time in the future at which the tire should be replaced, it may be defined as a distance which the vehicle can be driven before the tire should be replaced and/or a period of time which the vehicle can actually be driven before the tire should be replaced. The use of the positional data to determine the predicted tire change point may advantageously allow a tire change point to be determined which is based on the actual driving performed by the vehicle. This may, advantageously avoid, for example, the premature replacement of a vehicle tire when it would otherwise be expected that it would be due for replacement, but in fact based on the driving performed, is not necessary. The method may, therefore, minimize the downtime for a particular vehicle. The method may further comprise displaying the predicted tire change point, e.g. on a display screen.

Determination of the predicted tire change point may be based on recent, i.e. current, positional data for the vehicle and/or previous historical positional data for the vehicle. Determining the predicted tire change point based on the recent positional data for the vehicle may, in some instances, provide a more accurate indication as to the likely tire change point for the vehicle as the type of driving performed by the vehicle may have changed over time and thus historical positional data may not actually reflect the current and future driving of the vehicle. Recent positional data may, for example, correspond to driving data relating to driving performed in the past day, the past week, the past two weeks or the past month.

However, the use of recent driving data may not always be advantageous, and where the locations in which the driving performed by the vehicle is relatively uniform, taking into account the historical data for the vehicle may allow a more accurate predicted tire change to be determined. Historical driving data may, for example, correspond to driving data for at least the past month, e.g. at least the past 2 months, e.g. a least the past 6 months, e.g. at least the past year, e.g. at least past two years, e.g. at least the past three years, e.g. at least the past four years.

The predicted tire change point may be determined, using the positional data, in any suitable manner. In a set of embodiments, determination of the predicted tire change point may be based on the wear factor which is determined using the positional data. As will be appreciated, the wear factor is indicative of the wear experienced by tires on the vehicle and thus the wear factor may be used to determine the rate of wear of the tires on the vehicle, which may then be used to determine the predicted tire change point. For example, if the vehicle has a higher wear factor based on its positional data, e.g. because the vehicle is frequently driven on natural road surfaces, i.e. off-road, then the predicted tire change point will be sooner when compared to a vehicle with a lower wear factor, e.g. because it is largely driven on paved surfaces. Of course the wear factor this is not the only piece of information which may be used in the determination of the predicted tire change point, and any other information described herein may also be used. For example, the environmental conditions in which the vehicle is driven, which will be described in more detail below, may also be used in the determination of the predicted tire change point. For example, tires which experience particular environmental conditions may need to be replaced at different rates, and the environmental conditions may be taken into account in determining the predicted tire change point.

The predicted tire change point may be determined repeatedly for a particular vehicle, and the predicted tire change point may thus be updated. Advantageously, this may take into account that the locations in which the vehicle is driven may change thereby allowing a person, e.g. a fleet manager, who is responsible for managing the tires of the vehicle, to ensure that the tires are replaced at the most appropriate point. Accordingly, in a set of embodiments, the method comprises repeatedly determining the predicted tire change point for the vehicle. For example, the method may comprises repeatedly determining the predicted tire change point in real-time, for example at least whilst the vehicle is being driven. This may be considered to be dynamic updating of the predicted tire change point. The predicted tire change point determined each time the step is performed may be displayed, e.g. on a display screen. The rate at which the determination of the predicted tire change point is performed may depend on a number of factors, for example the rate at which the driving data is obtained from the electronic device on the vehicle.

Determining of the predicted tire change point may be based on positional data for a single vehicle. However, the method may be repeated for a plurality of vehicles, and determining the predicted tire change point may also be based on historical data for the plurality of vehicle.

Additionally, determining the predicted tire change point may also take into account the remaining tread depth on a tire on the vehicle. Taking into account the remaining tread depth may advantageously ensure that an accurate predicted tire change point can be determined, which may therefore minimize the down-time for a particular vehicle. The remaining tire tread depth may be physically measured, and a measured value may be used in determining the predicted tire change point. The remaining tire tread depth may, for example, be periodically measured and the remaining tire tread depth used in the determination of the predicted tire change point may be updated accordingly. For example, the remaining tire tread depth may be measured daily, weekly, monthly, or at any other suitable interval. Alternatively, the remaining tire tread depth may be estimated based on an initial known tread depth for the tire on the vehicle and the positional information obtained from the electronic device. In embodiments in which a wear factor is determined, estimation of the tire tread depth may be based on the wear factor. For example, it may be possible to estimate the amount of wear for a particular tire using the wear factor and make a reasonably accurate estimation of the remaining tread depth. Of course, any other method for estimating the tread depth may be used so as to enable to remaining tread depth to be taken into account for a particular vehicle.

Another consideration, which may be taken into account when selecting the tire for use on the vehicle, may be the environmental conditions in which the vehicle is driven. Environmental conditions, such as the temperature and/or weather which the vehicle typically experiences may impact which tires should be fitted to the vehicle. Sensors on the vehicle may determine the environmental conditions experienced by the vehicle. For example, in a set of embodiments, the vehicle comprises a temperature sensor, the driving data comprises temperature data obtained from the temperature sensor, and the step of selecting the suitable tire is also based on temperature data obtained from the temperature sensor. The temperature sensor may be a part of the electronic device on the vehicle and may supply temperature data. Alternatively, the temperature sensor may be connected to the electronic device and may supply temperature data to the electronic device. The use of a temperature sensor on the vehicle may advantageously mean that the temperature data accurately reflects the conditions actually experienced by the vehicle.

In another set of embodiments, the driving data comprises positional data and wherein the method further comprises determining, using the positional data, environmental conditions in which the vehicle is driven, and wherein the selecting of the suitable tire for the vehicle is also based on the environmental conditions in which the vehicle is driven. The use of positional data to determine the environmental conditions in which the vehicle is driven may advantageously mean that there is no requirement for sensors on the vehicle which are capable of detecting environmental conditions, e.g. temperature sensors.

The environmental conditions may be determined in any suitable manner using the positional data. For example, determining the environmental conditions may comprise using an environmental conditions database in which positional information and the associated environmental conditions are stored, and matching the positional data to the positional information to determine the environmental conditions experienced by the vehicle. The environmental conditions stored in the database may, for example, comprise the temperature and/or weather conditions such as: snowy, wet, dry etc. Accordingly, the environmental conditions experienced by the vehicle may be determined using the positional data and the environmental conditions database. The method may be performed by a server, and the environmental conditions database may be stored on another external server. In order to determine the environmental conditions actually experienced by the vehicle, the positional data may comprise associated time data. The positional data may thus be considered to be time-stamped. In such embodiments, the environmental conditions database may comprise positional information, the associated environmental conditions and the associated times. Accordingly, when determining the environmental conditions experienced by the vehicle, the actual environmental conditions experienced at the time of driving may be determined. This may be particularly important where weather conditions, e.g. in the mountains, change depending on the time of year. Based on the determined environmental conditions, a suitable tire may then be selected. Once the environmental conditions experienced by a vehicle have been determined, an environmental conditions factor may be determined and this environmental conditions factor may then be used in determining the tire suitable for use on the vehicle. Taking into account the environmental conditions may ensure that a most suitable tire is selected for use with the vehicle. For example, if it is determined that the vehicle is driven substantially in wet conditions, a tire which is suitable for wet conditions may be selected.

Some locations, e.g. countries or worksites, have regulations which stipulate the type of tire which must be used on a particular. For example, certain countries, which experience particularly harsh winter weather, have regulations which require vehicles to be fitted with appropriate winter tires, at least during the winter period. Accordingly, in a set of embodiments, the driving data comprises positional data, and wherein the method comprises determining at least one location in which the vehicle is driven using the positional data and determining whether the at least one location has any tire regulations which specify the types of tires which must be used for said locations, and wherein selecting the tire suitable for use on the vehicle is also based on whether there are any tire regulations for the at least one location in which the vehicle is driven.

Accordingly, by using the positional data to determine the location(s) in which the vehicle is driven, and selecting a tire based on any regulations in said location(s), a tire which meets the relevant regulations may be selected. It may be the case that the vehicle travels through multiple locations, e.g. multiple countries, each having different tire regulations. In this case, where possible, a tire may be selected which meets the regulations for all locations. For example, if the regulations in a first location do not require any specific tire format, but the regulations in a second location specifically require a winter tire, for example, the selected tire may be a winter tire as this may meet the regulations in both locations. In such embodiments, the step of determining whether the at least one location has any tire regulations which specify the types of tires which must be used for said locations may comprise accessing a tire regulation database comprising locations and associated tire regulations and matching the determined locations to locations in the database to determine the associated tire regulations. As will be appreciated, the use of actual position data may allow a more reliable determination of the locations in which the vehicle is driven.

Some tires may be not be suitable for use with certain vehicles, for example because they are not designed to support the weight of a particular vehicle. Accordingly, in a set of embodiments, the vehicle comprises an associated vehicle specification and selecting of the suitable tire for use on the vehicle is also based on the vehicle specification. Taking into account the vehicle specification may ensure that only a tire that is actually suitable for use with the particular vehicle is selected. The vehicle specification may comprise any information relating to the vehicle which may impact the type of tire which can be used thereon. For example, the vehicle specification may comprise the vehicle type, the unladen weight of the vehicle, the laden weight of the vehicle, the maximum speed of the vehicle, the size of the vehicle, the recommended use of the vehicle, the required tire size etc. For example, a non-exhaustive list of vehicle types may include: motorbikes, cars, vans, minibuses, buses, ultra-light trucks, very light trucks, light trucks, medium trucks, heavy trucks, and off-road trucks. The type of vehicle may impact the type of tire which can be used thereon. Taking into account the vehicle specification when selecting the tire may further improve the selection and ensure that a most suitable tire is selected. As an example, when selecting the tire based on the road type driving profile alone, it may be the case that two different tires appear equally suitable for use on the vehicle. However, it may be the case that one tire is better suited for use on a heavier vehicle and the other tire better suited for use on a lighter vehicle. Therefore, by taking in to account the vehicle specification, which may include the weight of the vehicle, it may then be possible to select the most appropriate tire for use on the vehicle, for example by accounting for the weight of the vehicle.

The driving data may be analyzed as a wholesale process. For example, the driving data may be collected on the electronic device across a period of time, e.g. one month, at the end of which the driving data may be obtained, e.g. extracted from the electronic device, and the method described herein may be performed to select a suitable tire. Similarly, the driving data may be obtained from the electronic device over a period of time, but the further analysis, such as determination of the amount of driving performed on at least one road type, or any other appropriate information which may be used in selecting the suitable tire, may only be performed at the end of the period. In a set of embodiments, however, the driving data relating to the driving of the vehicle comprises driving data for a plurality of trips, and wherein the method further comprises determining the amount of driving performed on at least one of the plurality of road types separately for each of the plurality of trips and wherein the road type driving profile is formed based on an aggregation of the amounts of driving performed on one or more road types as determined for each of the plurality of trips. In such embodiments, the amount of driving performed on each road type may be aggregated as each trip is performed. This may, for example, allow a fleet manager to see how the road types driven on by the vehicle changes over time. The process described above may also be applied to the determination of the damage and/or wear factor and/or the environmental conditions and/or the locations in which the vehicle is driven.

In some embodiments, the method comprises obtaining the driving data from the electronic device in real-time as the vehicle is driven. This may allow analysis to be performed in real-time. In a further set of embodiments, the step of determining the amount of driving performed on each road type and forming the road type driving profile is performed in real-time. The determination as to the amount of driving may thus be performed gradually as the vehicle is driven and the formation of the road type driving profile may be updated accordingly. As such, the tire which is selected for use on the vehicle may be updated as the vehicle is driven. Similarly, the damage factor and/or wear factor and/or the environmental conditions and/or the locations of the vehicle may be determined in a similar manner, i.e. in real-time. Irrespective of the information which is used in the selection of the tire, in embodiments wherein the driving data is obtained in real-time, the step of selecting the tire may also be performed in real-time as the vehicle is driven. As such the selected tire suitable for use on the vehicle may be updated as the vehicle is driven further. This may allow for the dynamic monitoring of the selected tire for the vehicle. Real-time is intended to mean that the driving data is transmitted from the electronic device during the driving of the vehicle. The driving data may not necessarily be transmitted as soon as the data is generated, instead portions of driving data may be packaged together and sent at predetermined times. In order to facilitate real-time transfer of the driving data, the electronic device may be capable of wirelessly transmitting the driving data so as to enable analysis thereof.

Depending on the number of tires available for selection, and the information relating to the most suitable use(s) of the tires, it may be possible to select a suitable tire based on the road type driving profile formed from the amount of driving on one or more road types alone, or additionally using the damage factor, wear factor, environmental conditions, the location and tire regulations and/or the vehicle specification. In some further embodiments, the driving data comprises further data relating to at least one of: the number of times the vehicle stopped, the average speed of the vehicle, acceleration of the vehicle, deceleration of the vehicle, brake usage, driving time and gear change data, and wherein the selecting of the suitable tire is also based on at least one of said further data. The use of such further data may improve the tire selection. For example, two tires may be known to be suitable for road type driving profiles which involve predominant driving on highways, but one tire may be more suitable for higher average speeds. Accordingly, through use of the further data, which may include for example the average speeds of the vehicle, it may be possible to further improve the selection of the tire so that the most optimal tire is selected for the vehicle.

It may be possible to select a suitable tire for a vehicle based on a road type driving profile which has been formed based on driving data relating to only a single trip, or a single day of driving. This may be possible if, for example, it is known that the vehicle will perform the same type of driving, or drive the same route, every trip or every day. However, for many vehicles this may not be the case. Accordingly, in a set of embodiments the driving data relates to the driving of the vehicle for at least one day, e.g. at least one week, e.g. at least two weeks, e.g. at least one month. Through the use of driving data for longer periods of time, it may be possible to make a tire selection which is more appropriate for the vehicles average driving. Considering, for example, a one month driving period, a vehicle may drive on highways predominantly for 28 days in the month and drive on extra-urban roads predominantly for 2 days in the month. If the data was only collected for a day which happened to coincide with a day on which the vehicle was predominantly driven on extra-urban roads, the selected tire may not be the most suitable for the road types on which the vehicle is predominantly driven. Thus by collecting and analyzing the driving data for the entire month, it may help to ensure that the selection is not skewed by the data from a particular day. In the example above, the most suitable tire may thus be a tire which is suitable for predominant use on a highway. The same logic described above may equally apply to use of the damage factor, wear factor, environmental conditions, locations and tire regulations, in determining the most suitable tire for use on the vehicle.

Instead or in addition to the time period over which the driving data is obtained, the driving data may be related to a number of trips performed by the vehicle. For example, the driving data may relate to just one trip, or a plurality of trips, e.g. at least 2 trips, e.g. at least 5 trips, e.g. at least 10 trips, e.g. at least 100 trips. A trip may be defined by as the journey between a vehicle starting point and its destination. The vehicles engine may be switched on and off during the trip, e.g. for refueling or for rest stops.

Selection of the suitable tire based the road type driving profile may take into account a number of different factors as discussed above. In a set of embodiments, the step of selecting the suitable tire for the vehicle comprises selecting a first tire if a road type, in the road type driving profile, has an amount of driving performed above a threshold level. As mentioned above, the amount may be a distance in which case the threshold level may be a distance driven, e.g. 2000 km, on a particular road type. The amount may also be a time in which case the threshold level may be a time driven, e.g. 30 hours, on a particular road type. Similarly, the amount on each road type may be a proportion of driving performed on each road type in which case the threshold level may be a proportion, e.g. 70%, performed on a particular road type. Such a method may provide for a relatively simple mechanism for selecting a suitable tire based on the road type driving profile. Of course additional factors may also be considered when selecting the suitable tire. For example, it may first be determined whether the driving is performed over the threshold level, and then other factors may be considered, such as those detailed above with regard to the further data.

The driving data may be obtained from the electronic device in any suitable manner, for example as a one-off download or periodic data download. The driving data may be obtained through a wired connection to the electronic device, or alternatively the data may be obtained wirelessly, for example the electronic device may be configured to wirelessly transmit the driving data.

As discussed previously, selecting of the tire need not necessarily involve physical selection of the tire. In a set of embodiments, the selecting of the tire comprises displaying the suitable tire on a display screen. A person may then decide, based on the displayed suitable tire, whether to recommend the tire to be fitted to the vehicle.

The method of any of the embodiments described above may be performed for a single vehicle, so as to select a suitable tire for that particular vehicle. In a set of embodiments, the method may also be repeated for each of a plurality of vehicles, e.g. a fleet of vehicles, and a tire selection may be made for each of the vehicles. In other words, the tire selection may be performed separately for each vehicle in the fleet based on the individual road type driving profile, or indeed any other contributing factor as described above, for each vehicle. The method may also be carried out for a sub-set of vehicles in the fleet, and a tire selection may be made for the entire fleet of vehicles based on the tire selection for the sub-set of vehicles. Some fleets of vehicles may comprise different vehicles for different purposes, e.g. vehicles for use on long haul trips and vehicles for use on local trips. In this exemplary case, a tire selection may be made for each sub-category of vehicle.

In any of the embodiments discussed above, the selecting of a tire suitable for use on the vehicle may comprise selecting a plurality of tires suitable for use on a vehicle. For example, based on the information taken into account in selecting the tire, it may be the case that multiple tires are equally suitable for use on the vehicle. As such, multiple tires may be selected, and it may then be down to a person to choose which tire is to be fitted.

The present invention extends to a central controller or server configured to implement any of the methods described herein. Thus, according to a further aspect of the present invention there is provided a server, for determining the most suitable tire for use on a vehicle, the server comprising a processor and a tangible memory storing computer-executable instructions that, when executed by the processor, cause the server to:

obtain driving data relating to the driving of the vehicle;

determine from the driving data an amount of driving performed on at least one of a plurality of different road types, and form a road type driving profile comprising one or more road types of the plurality of different road types and the associated determined amount of driving performed thereon; and select, from a plurality of different tires, a suitable tire for the vehicle based on at least the road type driving profile.

It will of course be appreciated that the term 'server' as used herein means a computer or machine (e.g. server device) connected to a network such that the server sends and/or receives data from other devices (e.g. computers or other machines) on that network. Additionally or alternatively, the server may provide resources and/or services to other devices on the network. The network may be the Internet or some other suitable network. The server may be embodied within any suitable server type or server device, e.g. a file server, application server, communications server, computing server, web server, proxy server, etc. The server may be a single computing device, or may be a distributed system, i.e. the server functionality may be divided across a plurality of computing devices. For example, the server may be a cloud-based server, i.e. its functions may be split across many computers 'on demand'. In such arrangements, server resources may be acquired from one or more data centers, which may be located at different physical locations.

It will thus be appreciated that the processes described above which are carried out by the server, may be carried out by a single computing device, i.e. a single server, or by multiple separate computing devices, i.e. multiple servers. For example, all of the processes may be carried out by a single server which has access to all the relevant information needed. For example, it may have access to map data and to a tire database so that a single server can determine the amount of driving on each of one or more road types, form the road type driving profile, and select a suitable tire. Equally, the steps may be carried out by a distributed system which comprises multiple computing devices, i.e. multiple servers. For example, the determination of the amount of driving on each of one or more road types and the formation of the road type driving profile may be performed on one server, and the tire selection may be performed on a second server which has direct access to a tire database. The second server may, for example, be a tire manufacturer's server. Selection of the tire in this manner may mean that the most up-to-date tire information is used when making the selection as the tire manufacturer may keep the tire information regularly updated. This may result in the most optimal tire being selected for the vehicle.

It has already been described above how a tire may be selected based on driving data obtained from the electronic device. The server may be configured to carry out any of the methods described herein. In a set of embodiments, the server is a remote server located outside of the vehicle and the server is configured to obtain driving data from an electronic device fitted to the vehicle. The server may communicate with the electronic device in any suitable manner, for example through wireless communication via any suitable network.

According to a further aspect of the present invention there is provided a system comprising a server according to any of the embodiments disclosed herein and an electronic device in a vehicle, wherein the electronic device is configured to collect driving data, e.g. positional data, relating to the driving of the vehicle. The electronic device may also transfer the driving data to the server. The driving data may be transferred from the electronic device to the server in any suitable way, for example as a one-off or periodic data download. In at least some embodiments, the driving data is transmitted from the electronic device to the server, for example in real-time as described above. The electronic device may comprise any suitable means for transmitting the driving data to the server. For example, the electronic device may be capable of wireless communication, e.g. comprising a wireless communication module. The server may be remote from the electronic device. In at least some examples, the server is a data and computing server device.

In a further set of embodiments, the electronic device is a telematics device. The telematics device may be any device that is capable of collecting/generating data relating to the driving of the vehicle. This is described further below.

The system may further comprise an output terminal arranged to communicate with the server and display information relating to the road type driving profile and/or the selected, i.e. recommended, tire for the vehicle. The output terminal may be remote from the server, for example a fleet manager terminal which comprises a display screen. The tire selection may also be sent to other parties, e.g. a tire manufacturer or a shop. The output terminal may comprise a display device. In such embodiments, the computer-executable instructions, when executed by the processor, cause the server to display the information relating to the road tire driving profile and/or the selected tire for the vehicle. Other information relating to the damage factor, wear factor, environmental conditions, location-specific regulations, vehicle specifications and/or the predicted tire change point may also be displayed by the output terminal.

The server-based system may be configured to carry out any of the methods described herein. For example, in one set of embodiments, the server is configured to repeat the aforementioned steps for a plurality of vehicles in a fleet of vehicles, and select a suitable tire for each vehicle based on the road type driving profile for each vehicle. Of course, selection of the tire may also be based on the damage factor, wear factor, environmental conditions, location-specific regulations and/or vehicle specifications for each particular vehicle in the fleet. In performing this method, the server acts to select a suitable tire for each individual vehicle, thereby allowing a fleet manager to equip each vehicle with an appropriate type of tire.

According to another aspect of the present invention, there is provided a computer program product comprising computer-executable instructions, optionally embodied in a non-transitory computer readable medium, which, when read by a machine, cause the machine to perform the method according to any embodiment described herein.

According to a further aspect of the present invention, there is provided a (non-transitory) computer readable medium having the computer program product of described above stored therein.

Some general features will now be described that apply equally to any of the embodiments described hereinabove.

While the electronic device may possibly be a mobile device located in the vehicle (e.g. a driver's mobile phone), preferably the electronic device is a fixed device in the vehicle, for example the electronic device may be plugged into an On-Board Diagnostics (OBD) port or even integrated with the on-board vehicle computer. The fixed device may include mechanical and/or electrical mounting means (e.g. for connecting to the power supply from the vehicle battery). The electronic device may be a telematics device. The electronic device may also be capable of wirelessly transmitting the driving data. In various examples, the electronic device may comprise one of the LINK tracking devices available from Webfleet Solutions B.V. The electronic device may be temporarily arranged on the vehicle so as to collect driving data, and may be removed once sufficient data is collected. The electronic device may obtain the driving data in any suitable manner. In embodiments which utilize positional data, the electronic device may determine the positional data, e.g. determine the actual position, of the vehicle in any suitable manner. In a set of embodiments, the electronic device comprises a position sensor, e.g. a GPS receiver (or any other global navigation satellite system (GNSS) receiver, or equivalent location-determining deice), arranged to determine the position of the vehicle. The position sensor may therefore generate the position data. The position data of the vehicle may be logged by a processor in the electronic device.

BRIEF DESCRIPTION OF THE SEVERAL VIEWS OF THE DRAWINGS

One or more non-limiting examples will now be described, by way of example only, and with reference to the accompanying figures in which:

FIG. 1A is a schematic overview of a system for determining a suitable tire for use on a vehicle in accordance with an embodiment of the present invention;

FIG. 1B is a schematic overview of various functional units which may make up the server of the system shown in FIG. 1A;

FIG. 5 shows a table illustrating a tire database;

FIG. 11 is an illustration of a database comprising location, damage factor and wear factor information;

FIG. 12 is an illustration of a database comprising location and environmental condition information;

FIG. 13 is an illustration of a database comprising location and tire regulation information;

and

Figure 2:
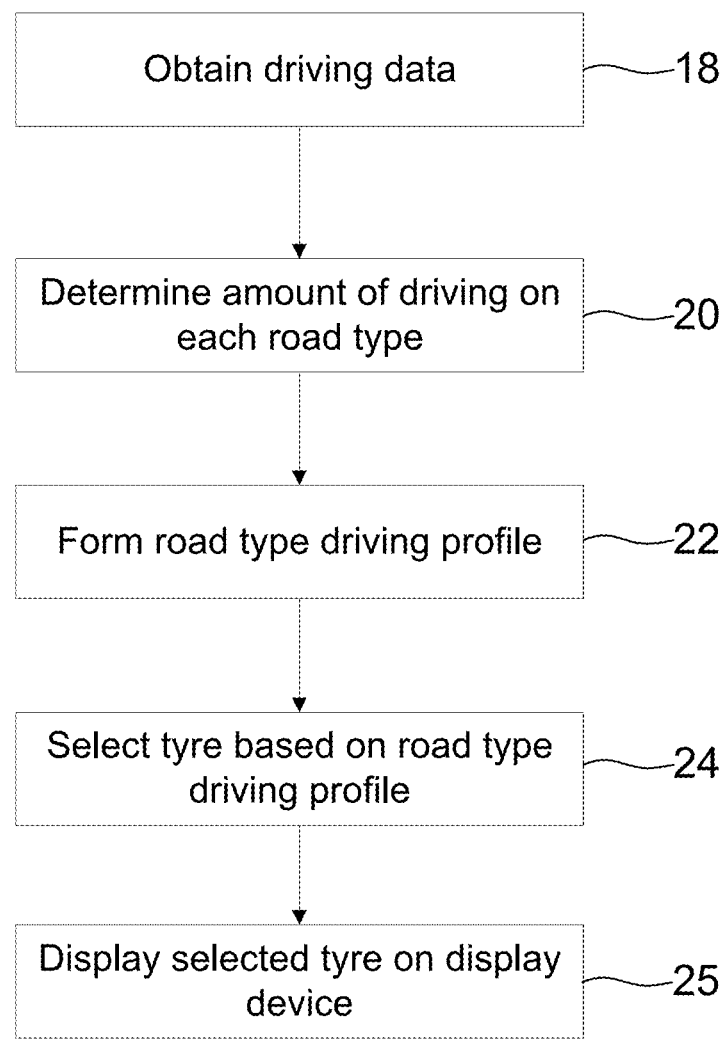
FIG. 2 is an overview of a method for determining a suitable tire for use on a vehicle in accordance with an embodiment of the present invention.

FIG. 14 is an illustration of a vehicle specification.

DETAILED DESCRIPTION OF THE INVENTION

FIG. 1A is a schematic overview showing a system 2 for selecting a suitable tire for use on a vehicle 4. The vehicle 4 carries an electronic device 6, which may be a telematics device. The electronic device 6 may comprise a plurality of sensors for generating data relating to the vehicle 4. For example, the electronic device 6 may comprise a position sensor, e.g. a GPS sensor, configured to generate positional data relating to the driving of the vehicle 4. The electronic device 6 may be capable of wirelessly transmitting driving data 8 to a server 10. As depicted, the server 10 is located remotely from, and outside of, the vehicle 4. As discussed above, the electronic device 6 may be any device capable of collecting driving data. For example, it may be a mobile device, e.g. a mobile phone, carried by a driver of the vehicle. Alternatively, the electronic device 6 may be a device that is connected to, or an integral part of, the vehicle 4. For example, the electronic device 6 may be connected to an OBD port of the vehicle 4. The electronic device 6 may be temporarily, or permanently, installed on the vehicle. The electronic device 6 may be a LINK device as described above.

Whilst it may be advantageous for the electronic device 6 to be capable of wirelessly transmitting the driving data 8 to the server 10, this is not essential. Instead, the electronic device 6 may transmit driving data to the server 8 over a wired connection. For example, the electronic device 6 could be removed from the vehicle 4 and the driving data 8 may be downloaded from the electronic device 6 via suitable means.

The server 10 comprises a processor 12 and a tangible memory 14 which store a computer product comprising computer-executable instructions to perform a method for determining the most suitable tire for use on the vehicle 4. Of course the processor 12 may comprise one or more processing devices, for example multiple processing devices arranged in series or parallel. The method for selecting a suitable tire for use with the vehicle is shown in FIG. 2 and described in more detail below. The server 10 may comprise a computer readable medium having the computer program stored thereon. The system 2 further comprises an output terminal 16 which may be used to output information relating to the driving data, for example the road type driving profile formed from the driving data, as well as the selected, i.e. recommended, tire suitable for use with the vehicle 4. The output terminal 16 may be remote from the server 10 and may be a fleet manager's terminal. The output terminal 16 may be in the form of a display device. The output terminal may comprise a fleet manager's display screen.

Although not shown in FIG. 1A, a plurality of vehicles 4 may each transmit driving data 8 the same remote server 10. Such a system 2 may therefore be used to form road type driving profiles for multiple vehicles 4 in a fleet.

FIG. 1B is a schematic overview of a road type determination unit 11, a road type driving profile calculation unit 13, and a tire selection unit 15. As shown, the tire selection unit 15 may have access to a tire database 17. The various units 11, 13, 15, may all form part of the server 10 and be carried out by a single processor 12 of the server 10. Each of the units 11, 13, 15, may thus be part of a single computing device. The tire database 17 may also be incorporated in the same computing device. Alternatively, however, each of the units 11, 13, 15 and the tire database 17 may be implemented by separate dedicated computing devices, e.g. independent processors 12, which may thus form a distributed system. For example, the tire selection unit 15, and associated tire database 17, may be implemented, separately from the road type determination unit 11 and road type driving profile calculation unit 13, on a computing device of a tire shop. Such a setup may advantageously mean that the tire selection is carried out using the most up-to-date tire data, which may be maintained by the tire manufacturer. Use of each of the units 11, 13 and 15 will be described in more detail below with reference to FIG. 2.

FIG. 2 depicts a flowchart of a method for determining a suitable tire for use on the vehicle 4. The method may, for example, be performed by the system 2 described above, for example it may be performed by the server 10, e.g. by the processor 12 of the server 10. The method comprises obtaining driving data in step 18. As discussed above with regard to the system 2 shown in FIG. 1, the driving data 8 is obtained from the electronic device 6 in the vehicle 4 and may be obtained via any suitable means, such as wireless transmission. The driving data 8 relates to the driving of the vehicle 4. The driving data 8 may be obtained from the electronic device 6 on the vehicle 4 in in real-time as the vehicle is driven. In step 20, the method includes determining or calculating, from the driving data 8, the amount of driving performed on each of a plurality of different road types. This step may be performed by the road type determination unit 11 described above with reference to FIG. 1B.

Figure 3:
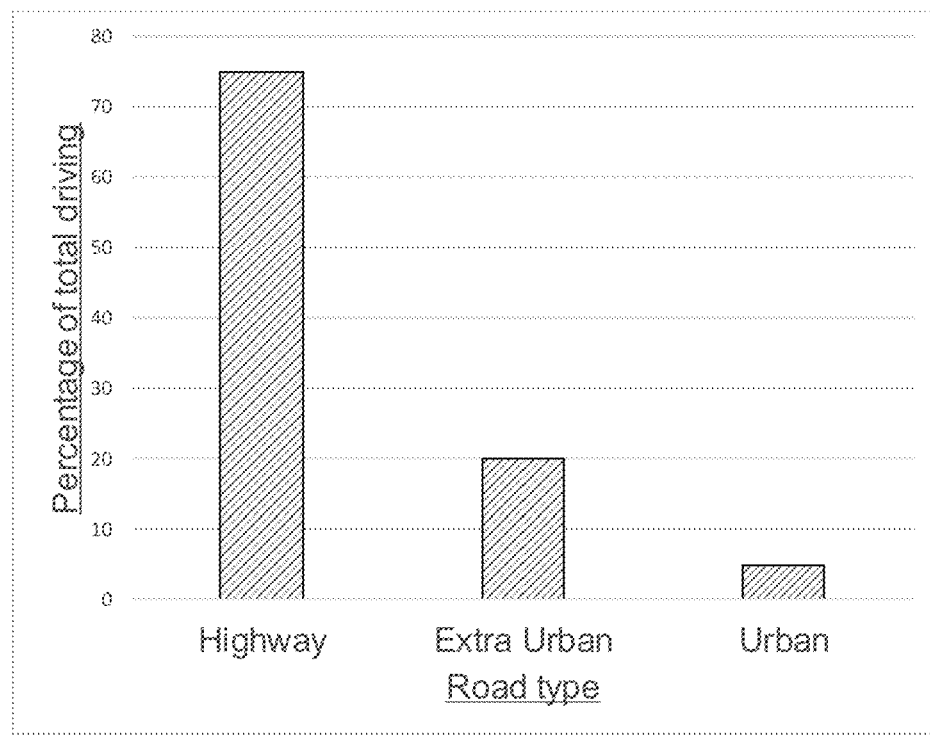
FIG. 3 shows a first exemplary road type driving profile.
Figure 4:
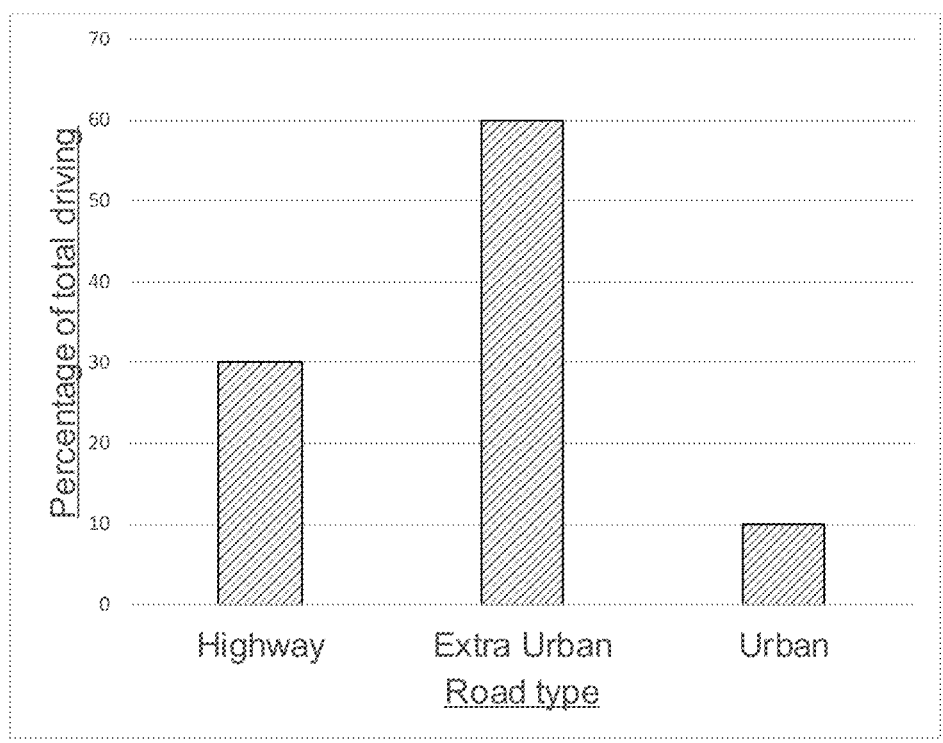
FIG. 4 shows a second exemplary road type driving profile.

In at least some examples, the driving data 8 includes positional data and the memory 14 has map data 9 stored therein, the map data 9 representing a road network and including a road type designation for each road segment in the road network. In step 20 the processor 12 is configured to match the positional data to the map data in the memory 14 to determine the one or more road types driven on by the vehicle. This step 20 may also be performed by the road type determination unit 11 described above with reference to FIG. 1B The amount of driving performed on at least one road type may be based on the time spent driving on each road type and in addition or alternatively, it may depend on the distance driven on each road type. In step 22, a road type driving profile is formed or calculated which comprises one or more road types and the associated determined amount of driving performed thereon. This step 22 may be performed by the road type driving profile calculation unit 13. Illustrative road type driving profiles are shown in FIGS. 3 and 4 and will be described in more detail below. Following the formation of the road type driving profile(s), the method proceeds to step 24 which comprises selecting, from a plurality of different tires, a suitable tire for the vehicle 4 based on at least the road type driving profile. This step may be performed by the tire selection unit 15. The tire selection unit 15 may access the tire database 17 when carrying out this step 24. The step of selecting a suitable tire in step 24 may comprise displaying the selected tire, as illustrated at step 25. The selection based on the road type driving profile may depend on a number of different factors. The selection of the tire will be described in more detail later with reference to FIG. 6. The method described above may be performed in real-time, i.e. the step 20 of determining the amount of driving on each road type may be performed in real-time and the road type driving profile may be formed/updated in step 22 in real time. However, this is not essential, and instead the driving data 8 may be collected and the method may be performed once sufficient driving data 8 has been obtained, e.g. after a month of driving of the vehicle.

FIGS. 3 and 4 illustrate exemplary road type driving profiles which may be formed for two different vehicles each of which are driven different amounts on each road type. The road type driving profiles shown are merely for illustrative purposes and do not necessarily represent an actual road type driving profile for an actual vehicle. In each of the road type driving profiles shown, the profile is split into three road types: highway, extra-urban and urban, and the percentage of driving performed on each road type is shown. Whilst three road types are illustrated, any number of road types may define the road type driving profile. The percentage of total driving may be derived from the distance and/or time driven on each road type. Whilst the percentage of total driving is illustrated on the exemplary road type driving profiles, this is not essential, and other metrics may be used. For example, the road type driving profiles may be based on the distance and/or time driven on each road type.

FIG. 3 shows an exemplary road type driving profile generated for a vehicle. As shown, the vehicle has driven 75% on highways, 20% on extra-urban roads and 5% on urban roads. FIG. 4 shows an exemplary road type driving profile generated for a different vehicle. As shown, the vehicle has driven 30% on highways, 60% on extra urban roads and 10% on urban roads. Accordingly, as will be appreciated by those skilled in the art, following formation of the road type driving profile as illustrated, it may be possible to select a suitable tire for use with the vehicle. Considering the road type driving profile shown in FIG. 3, it may be the case that a tire which is suitable for predominant use on highways is selected for that vehicle. Considering the road type driving profile of FIG. 4, a tire which is suitable for predominant use on extra urban roads may be selected for that vehicle. Accordingly, for each vehicle, a suitable tire may be selected based on the actual driving performed by the vehicle. The selection of the most suitable tire may thus involve analysis of the road type driving profile to determine which road type is driven on predominantly, i.e. for the most time and/or for the most distance.

FIG. 5 is an illustrative example of a tire database which comprises a plurality of different tires, including: tire 1, tire 2, tire 3, tire 4, tire 5 and tire 6. The tires may be any tire made by any manufacturer. The tires may also be specific for a particular type of vehicle, such as a cars or commercial vehicles. For example, the tires may be tires manufactured by Bridgestone, and may be designed for use with commercial vehicles. Exemplary tires made by Bridgestone may include models such as Duravis, or Ecopia. The tire database also includes information regarding the suitability of each tire for different driving conditions. As shown, the optimal road type is shown for each tire, along with the minimum driving proportion which is required for that tire on the optimal road type. Further data is also included for exemplary purposes. In the exemplary tire database shown, the further data includes the optimal minimum average speed in km/h and also the average optimal number of gear shifts per hour. Of course, additional and/or different further data may be included. Taking, for example, tire 1, it can be seen that tire 1 is intended for use on highways wherein the amount of driving on highways is at least 70%. Further, it can be seen that the minimum average speed is 65 km/h and the optimal average number of gear shifts per hour is 10. Similar information is provided for each of the other tires.

Once a road type driving profile is formed for a vehicle, selection of a suitable tire may be carried out using the information provided in a tire database, for example the database shown. Taking the example of a road type driving profile which has been formed for a vehicle, in which the vehicle is driven 75% of the time on highways. As depicted in the tire database, two different tires, tires 1 and 2, may both be suitable for predominant use on highways, and thus either may be selected for use with the vehicle having the profile mentioned above. Thus in its simplest form, the selection of a suitable tire may comprise selecting a tire from the tire database in which each of the plurality of tires is known for predominant use on a particular road type. However, further data may be utilized in order to select the most suitable tire for use on the vehicle. For example, if the further data obtained from the vehicle includes the average speed of the vehicle, it may be possible to select from tire 1 and tire 2 the tire which is most suitable for the average speed of the vehicle. For example, if it is known that the vehicles average speed is 52 km/h, tire 2 may be selected. A similar process may be used for any of the further data obtained from the vehicle.

Figure 6:
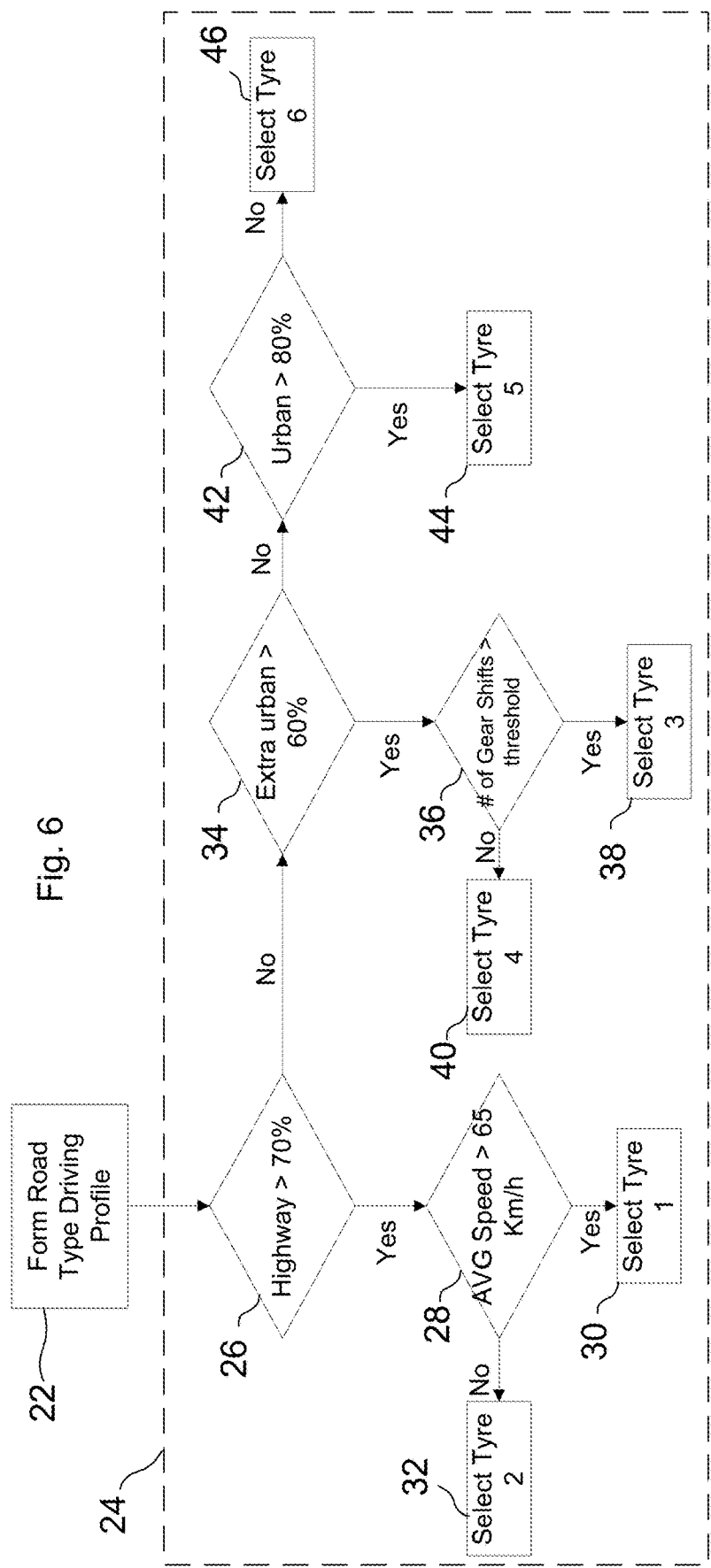
FIG. 6 shows a flowchart illustrating the step of selecting a suitable tire in accordance with an embodiment of the present invention.

With the road type driving profile formed for a vehicle, and with access to a tire database, a selection of a suitable tire may be performed through analysis of the road type driving profile and the tire database. Any suitable analysis may be performed in any suitable order. One exemplary process for analyzing the information contained within the road type driving profile is illustrated in FIG. 6. FIG. 6 is a flowchart illustrating in more detail the steps of forming the road type driving profile 22 and selecting the suitable tire 24 in accordance with an exemplary embodiment of the present invention. The various determinations performed as part of the illustrative example may be at least partly defined by information contained within the tire database and may be answered based on the formed road type driving profile. For example, the various thresholds, which will be discussed in more detail, may be defined by information within the tire database.

The steps included in the dashed box may all be considered to form part of the step of selecting a suitable tire 24 as mentioned above with regard to FIG. 2. In the exemplary embodiment shown, the driving data 8 obtained from the vehicle 4 may include further data relating to at least one of: the number of times the vehicle stopped, the average speed of the vehicle, acceleration of the vehicle, deceleration of the vehicle, brake usage, driving time and gear change data, and wherein the selecting of the suitable tire is also based on at least one of said further data. As will be explained in more detail below, at least some of this further data may be used when selecting the tire suitable for use with the vehicle 4.

Following the formation of the road type driving profile in step 22, the process may proceed to selecting a tire 24 suitable for use with the vehicle based on the road type driving profile. This may first involve step 26 in which the road type driving profile is analyzed to determine whether the amount of driving on highways is more than a pre-set threshold, e.g. 70%. If it is determined that this is the case, the process may proceed to step 28 in which the road type driving profile is analyzed to determine if the average speed of the vehicle is above a threshold, e.g. 65 km/h. If it is determined that the average speed is above the threshold, then in step 30, tire 1 may be selected. Accordingly, tire 2 may be selected at least if the amount of driving on one road type is above a threshold level. If it is determined that the average speed is less than the threshold, then tire 2 may be selected in step 32.

If, at step 26, it is determined based on the road type driving profile that the vehicle spends less than the threshold on highways, then at step 34 is determined whether the vehicle is driven more than a threshold amount, e.g. 60%, on extra-urban roads. If it is determined that the vehicle is driven more than the threshold amount on extra-urban roads, at step 36 it is determined whether the number of gear shifts exceeds a threshold value. The threshold value for gearshifts may be any suitable value which is relevant to a particular tires performance. If this is the case, then at step 38 tire 3 is selected. If it is determined that the vehicle does not exceed the threshold number of gear shifts, tire 4 may be selected. The threshold value for gear shifts may depend on the road type being considered. For example, the number of gearshifts when driving on a highway may be less than the number of gearshifts compared to an urban road. For example, the number of gearshifts on a highway may be at least 10%, 20%, 30%, 40% or 50% less than the number of gearshifts on an urban road. A tire may be designed for use with certain ranges of gear shifts.

If at step 34, it is determined based on the road type driving profile that the vehicle does not exceed the threshold amount of driving on extra urban roads, the process proceeds to step 42 in which it is determined, based on at least the road type driving profile, whether the vehicle is driven more than a threshold, e.g. 80%, on urban roads. If it is determined that the vehicle is driven on urban roads for more than the threshold amount, then tire 5 may be selected for the vehicle in step 44. If, however, it is determined that the vehicle does not exceed the threshold for driving on urban roads, then tire 6 may be selected.

With reference to FIG. 6, the various thresholds and determinations illustrated therein are merely exemplary and not intended to be limiting. As mentioned previously, the thresholds and determinations may be defined by information relating to the tires available for selection, for example they may be defined from information in a tire database of the type illustrated in FIG. 5. Any combination of different thresholds and different additional data may be utilized when selecting a suitable tire for the vehicle. In addition, the determinations carried out in FIG. 6 may performed in any suitable order. For example, instead of first determining if the amount of driving is above a threshold on highways in step 26, the process may instead start at step 42 in which the amount of driving performed on urban roads is analyzed.

As discussed previously, the driving data 8 may comprise any data which allows the amount of driving on each road type to be determined. For example, the driving data 8 may comprise speed data, i.e. data relating to the speed of the vehicle at various points, which may allow for a determination of the road types driven on. It may be possible to deduce, depending on the particular vehicle, that if the vehicle has been travelling at a certain speed then it must have been travelling on a particular road type. However, in some embodiments the driving data 8 may comprise positional data which allows for the determination of the road types driven on by the vehicle.

Figure 7:
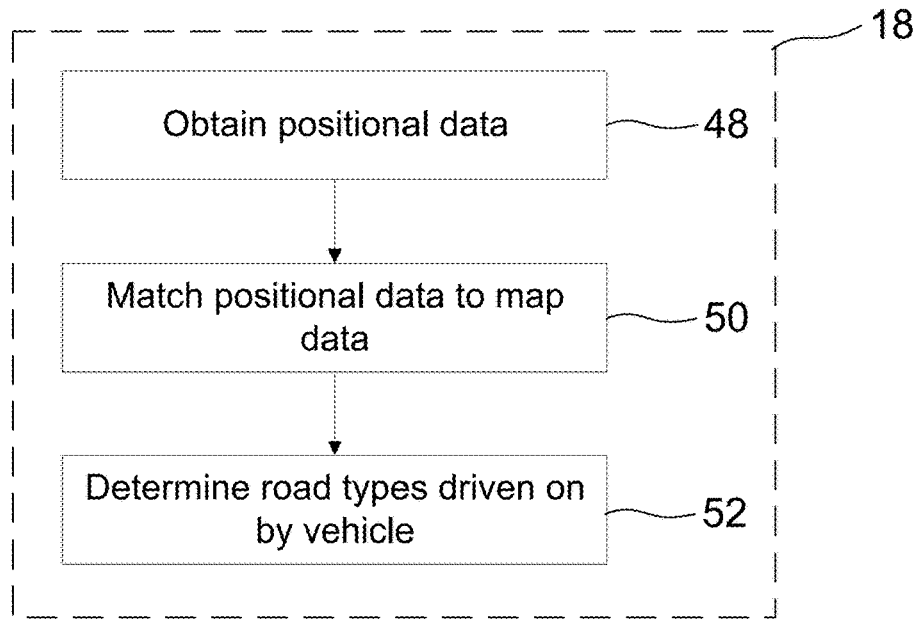
FIG. 7 shows a flowchart illustrating the obtaining of driving data in accordance with an embodiment of the present invention.

FIG. 7 depicts a flow chart illustrating the use of positional data in determining the road types driven on by a vehicle. The steps shown in FIG. 7 may be considered to be part of the step 18 of obtaining driving data. The process may start with obtaining positional data relating to the driving of the vehicle in step 48. In step 50, the positional data may then be matched to map data. The map data may represent a road network and include a road type designation for each road segment in the road network. In step 52, using the map matched positional data, the road types driven on by the vehicle may then be determined. In order to form the road type driving profile, the positional data which has been map matched may be aggregated into the different road types to determine the amount of driving performed on each road type. Determination of the amount of driving performed one each road type may be performed in parallel with the steps described above. For example, for a given positional data point, when it is determined based on the matching that it corresponds to a particular road type, a corresponding amount may be added to the total amount of driving performed on that particular road type. Accordingly, determination of the amount of driving on each road type may be aggregated as the positional data is analyzed to determine the road type driven on by the vehicle for any given data point.

Figure 8:
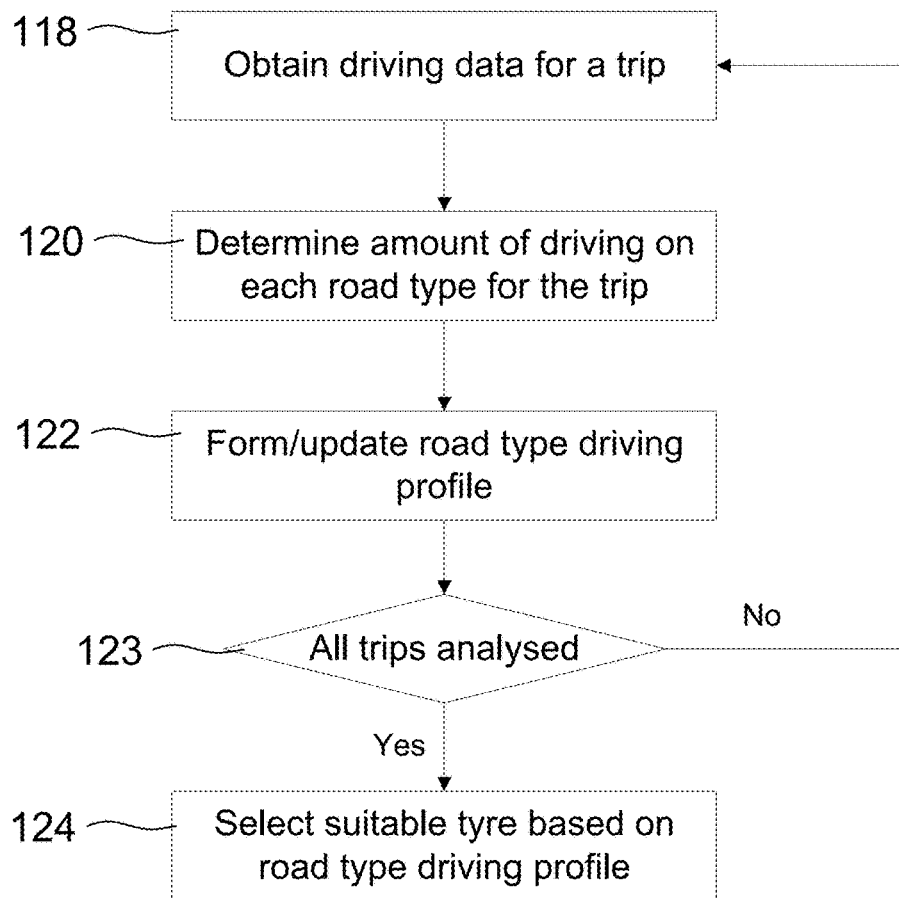
FIG. 8 shows a flowchart illustrating the aggregation of driving data for a plurality of trips.

FIG. 8 shows a variation on the embodiment shown in FIG. 2, which relates to the analyzing of driving data on a per trip basis. In step 118 driving data for a trip is obtained. In step 120, the amount of driving performed on each of the plurality of road types is determined for the trip. In step 122, the road type driving profile is formed. In step 123, it is determined as to whether all of a plurality of trips have been analyzed, if this is not the case, the process returns to step 118 and steps 120 and 122 are repeated. Accordingly, the amount of driving performed on each of the plurality of road types is determined separately for each of the plurality of trips. Further, the road type driving profile is updated for each trip 122 and thus may be based on an aggregation of the amounts of driving performed on each road type for each of the plurality of trips. If at step 123 it is determined that all of the trips, or a sufficient number of the trips, have been analyzed, the process proceeds to step 124 in which a suitable tire is selected based on the road type driving profile. The process described above, and shown in FIG. 8, may equally be applied to the determination of a damage factor, a wear factor, the environmental conditions experienced by the vehicle, and location-specific tire regulations of the vehicle 4.

Figure 9:
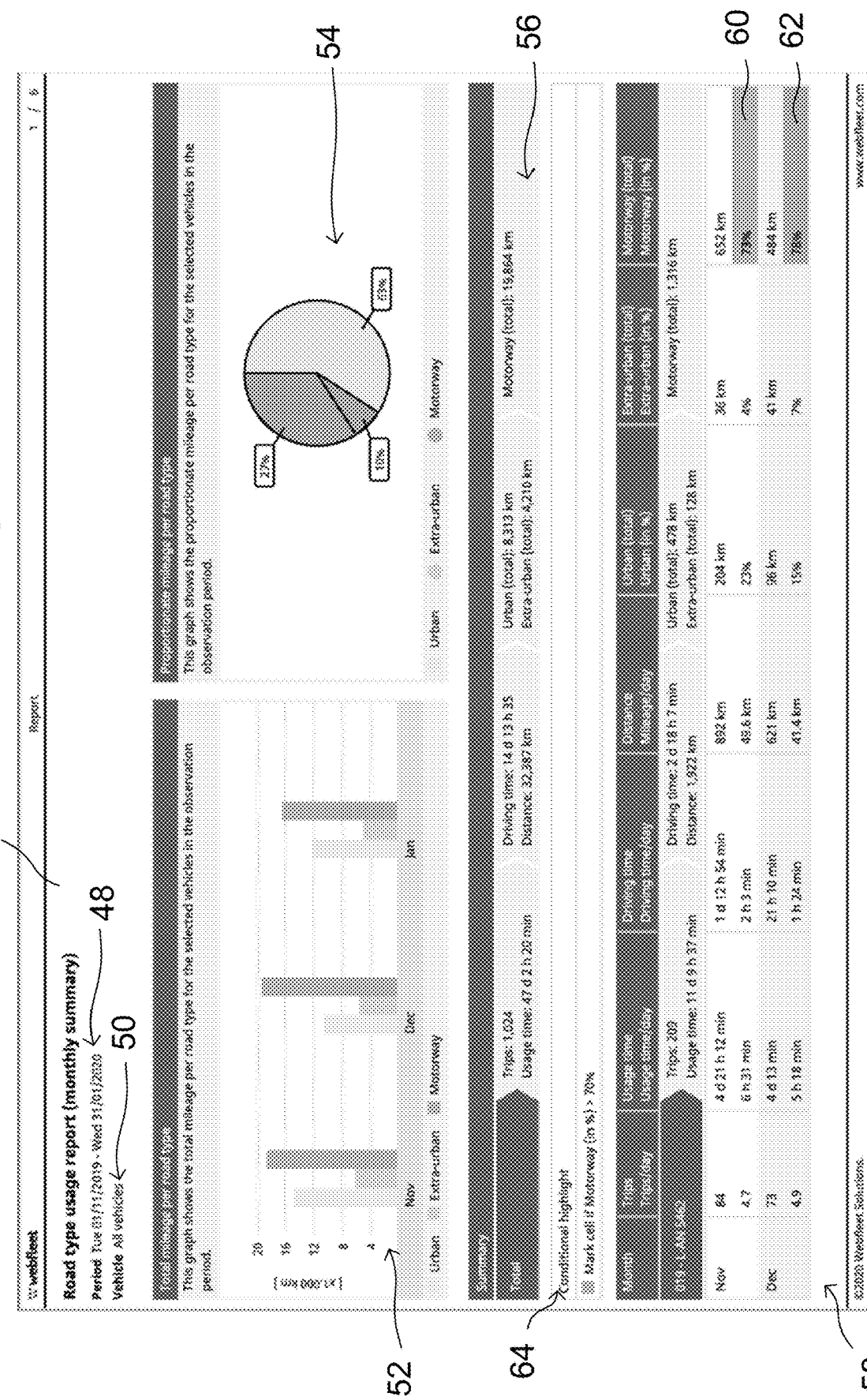
FIG. 9 shows an example of a display output on a fleet operator terminal.

FIG. 9 shows a display on the output terminal 16 which a fleet manager may use in order to select a tire suitable for use on the vehicle 4. The observation period 48, i.e. the amount of time for which the driving data relates to, is for three months, and the vehicle type 50 includes all vehicles. It may be possible for a fleet manager to change the observation period 48 and/or the vehicle type 50 depending on their particular needs. For example, they may increase or decrease the observation period or look at individual, or sub-sets of, vehicles rather than all vehicles. The output terminal 16 also displays the road type driving profile in various different formats each of which includes different information.

The output terminal 16 displays a total mileage per road type graph 52. As shown, this graph 52 shows the total mileage for each road type on a monthly basis. The output terminal 16 also displays a pie chart 54 showing the proportionate amount of driving performed on each road type for the observation period.

A summary 56 is also displayed which details the number of trips, usage time, driving time, distance driven, and the total distance driven on each of urban, extra-urban and motorway (highway) road types. A monthly breakdown table 58 is also displayed which includes: the trips, trips per day, usage time, usage time per day, driving time, driving time per day, distance, distance per day, distance on urban road type, percentage of driving on urban road type, distance on extra-urban road type, percentage of driving on extra urban road type, distance on motorway, percentage of driving on motorway. The table 58 is broken down into data for the vehicles for each month. As shown in the table 58, if the percentage of driving on a particular road type exceeds a threshold, the relevant cells of the table are highlighted. In the example given, cells 60 and 62 are shown to be highlighted as the percentages are 73% and 78% respectively. The threshold may be set in the conditional highlight section 64 which may be configured by the fleet manager in any suitable manner to suit their needs. For example, in addition or alternatively to the setting of highlighting for motorway driving percentages above 70%, it may be configured to highlight cells in which urban driving is above a certain threshold.

The information displayed, for example the road type driving profiles 52, 54, 56, 58, on the output terminal 16 may assist a fleet manager in selecting a suitable tire. For example, they may separately consult a tire database, for example of the type shown in FIG. 5, to select a suitable tire based on the displayed information. In addition, or alternatively, the output terminal 16 may also display a selected tire for use with the vehicle.

In any of the embodiments described above, the driving data 8 relating to the driving of the vehicle 4 may comprise data for the driving of the vehicle 4 for at least one day, e.g. at least one week, e.g. at least two weeks, e.g. at least one month. The amount of driving data required may depend on the typical usage of the vehicle 4 and how its usage varies over time.

Figure 10:
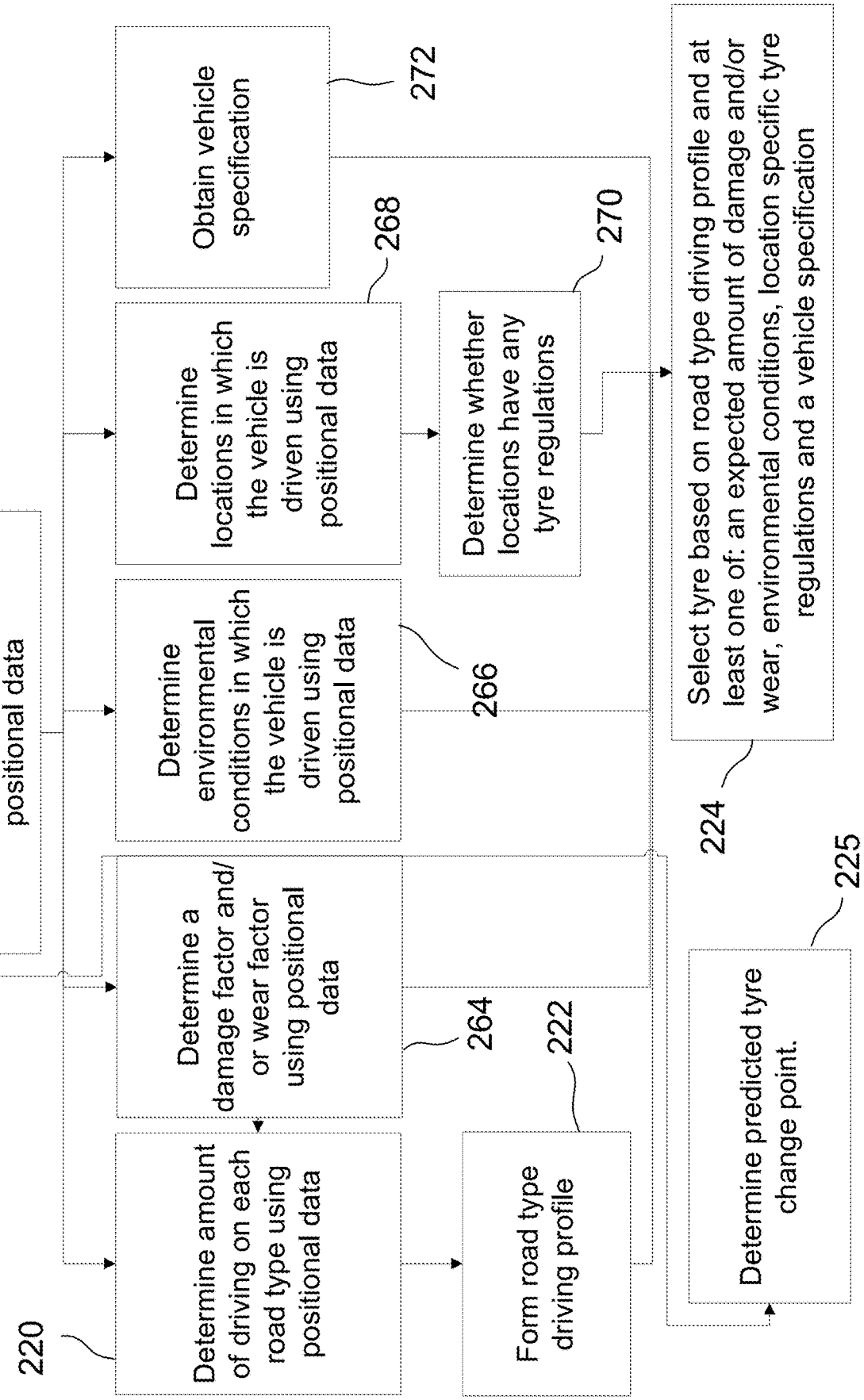
FIG. 10 is an overview of a method for determining a suitable tire for use on a vehicle in accordance with an embodiment of the present invention.

In the embodiments described above, only the road type driving profile has been used in the selection of the tire for use on the vehicle. However, as discussed previously, other information may be used in selecting the tire. FIG. 10 depicts a flow chart of a method in accordance with another embodiment of the present invention, for determining a suitable tire for use on the vehicle 4, which utilizes further information. The method comprises obtaining driving data, which comprises positional data, in step 218. The driving data 8 is obtained from the electronic device 6 in the vehicle 4 and may be obtained via any suitable means, such as wireless transmission. The driving data 8, comprising the positional data, relates to the driving of the vehicle 4. The driving data 8 may be obtained from the electronic device 6 on the vehicle 4 in in real-time as the vehicle is driven. In step 220, the method includes determining or calculating, from the driving data 8 which comprises positional data, the amount of driving performed on each of a plurality of different road types. This step may be performed by the road type determination unit 11 described above with reference to FIG. 1B.

In step 222, a road type driving profile is formed or calculated which comprises one or more road types and the associated determined amount of driving performed thereon. Step 222 may be performed by the road type driving profile calculation unit 13. Illustrative road type driving profiles are shown in FIGS. 3 and 4 and will be described in more detail below. Following the formation of the road type driving profile(s), the method proceeds to step 224 which comprises selecting, from a plurality of different tires, a suitable tire for the vehicle 4 based on at least the road type driving profile. This step may be performed by the tire selection unit 15. The tire selection unit 15 may access the tire database 17 when carrying out this step 24. Steps 218-224 are substantially the same as steps 18-24 described above with respect to FIG. 2, except that they are performed using positional data obtained from the driving data 8.

In the embodiment depicted in FIG. 10, the selection of the tire may also be performed based on at least one of a plurality of other information including a damage factor, wear factor, environmental conditions, location-specific tire regulations and a vehicle specification. This will be described in more detail below.

Following the step 218 of obtaining the driving data 8 comprising the positional data, the method may comprise step 264 which comprises determining, using the positional data, a damage factor and/or wear factor for a tire on the vehicle 4. Following the determination of the damage factor and/or wear factor, the method may then proceed to step 224 whereby the selection of the tire is performed using the damage factor and/or wear factor. The step 264 of determining the damage factor and/or wear factor may be performed by a suitably configured unit on the server 10, and the selecting of the tire based on this information may be performed by the tire selection unit 15 which may access a damage factor and/or wear factor database, as depicted in FIG. 11. FIG. 11 shows an exemplary database, provided for illustrative purposes, wherein each of locations 1, 2 and 3 have different associated damage and wear factors. Using the positional information, which forms part of the driving data 8, the damage and wear factor may be determined for the vehicle, by comparing the positional data to the positional information, i.e. the locations in the database. The damage and wear factor may then be when selecting the tire. For example, if a vehicle is driven in locations having a higher damage and wear factor, the expected amount of damage and/or wear may be larger and an appropriate tire may then be selected which accounts for this higher damage and/or wear. Of course, depending on the information available, only one of the damage and/or wear factor may be used in the selecting of the tire.

Other information may be used in selecting the tire and following the step 218 of obtaining the driving data 8 comprising positional data, the method may also comprise the step 266 of determining, using the positional data, environmental conditions in which the vehicle 4 is driven. In such embodiments, the positional data may include associated time data, i.e. the positional data may be time-stamped. As discussed previously, this may allow the actual environmental conditions experienced by the vehicle to be determined. The method may then proceed to step 224 whereby the selection of the tire may also be based on the environmental conditions in which the vehicle is driven. Determining the environmental conditions in which the vehicle 4 is driven may be performed by a suitable unit on the server 10 and the selecting of the tire based on the environmental conditions may be performed by the tire selection unit 15.

Determining the environmental conditions experienced by the vehicle 4 may comprise using an environmental conditions database as depicted in FIG. 12. FIG. 12 depicts an exemplary environmental conditions database, for illustrative purposes, whereby environmental conditions for different positional information, i.e. locations, are provided. The exemplary environmental conditions database depicted in FIG. 12 is for a given point in time which corresponds to a point in time associated with the positional information obtained from the vehicle 4. It will be appreciated that the environmental conditions database may comprise the environmental conditions for a plurality of locations at a plurality of different times. By comparing the positional data to the locations, it may be possible to determine the locations in which the vehicle 4 is driven, and thus the environmental conditions experienced by the vehicle 4. For example, it may be possible to determine from the positional information that the vehicle is largely driven in locations 1 and 2, and thereby experiences averages temperatures between 18-23° C. and experiences dry weather conditions. These two pieces of information may then form the environmental conditions for the vehicle 4, and the selecting of the tire in step 224 may be based on these environmental conditions. As will be appreciated, the data set illustrated in FIG. 12 is merely shown for illustration purposes and the environmental conditions may comprise any suitable conditions.

In addition, or alternatively to the above, following step 218 of obtaining the driving data 8 comprising positional data, the method may also comprise the step 268 of determining at least one location in which the vehicle is driven using the positional data. In step 270 the method may then comprise determining whether the at least one location has any tire regulations which specify the types of tires which must be used for said locations. These steps may be performed by a suitable unit on the server 10. The method may then proceed to step 224 whereby the selection of the tire may be based on the tire regulations for the at least one location in which the vehicle 4 is driven. This step may be performed by the tire selection unit.

Determining the location(s) in which the vehicle is driven may comprise using a location-specific tire regulation database as depicted in FIG. 13. FIG. 13 depicts a location-specific tire regulation database relating to winter tire regulations, for illustrative purposes. As depicted, the locations are in the form of countries, but it will be appreciated that any other form of location may be used. For example, the locations may be in the form of regions within a country. Each of the countries comprises a corresponding winter tire regulation, whereby a winter tire is either required, or not required. Following the determination of the locations in which the vehicle 4 is driven in step 268, the positional data may be matched to positional information, i.e. the countries, in location-specific tire regulation database, and the countries in which the vehicle 4 is driven may then be determined. Any tire specific regulations may then be analyzed and this may then be used in the selecting of the tire performed in step 224. For example, if it is determined that the vehicle drives in a country where a winter tire is required by the regulations, e.g. such as Germany, when the method proceeds to step 224 wherein the tire is selected, this information may be taken into account and only a winter tire may be selected. It will be appreciated that the data set shown in FIG. 13, and described above, is merely provided for illustrative purposes and any suitable data set comprising any form of location and associated tire regulation, may be used.

In addition, or alternatively to the above, following step 218 of obtaining the driving data 8 comprising positional data, the method may also comprise the step 272 comprises obtaining a vehicle specification of the vehicle 4. The method may then proceed to step 224 whereby the selection of the tire may be based on the vehicle specification of the vehicle 4. This step may be performed by the tire selection unit 15.

FIG. 14 illustrates an exemplary vehicle specification for a given vehicle 4. In the exemplary specification depicted, information relating to the type, use, unladen weight, maximum laden weight and maximum speed is provided. This information may be used in step 224 when selecting a suitable tire. For example, based on the other information considered, e.g. the road type driving profile, there may be a plurality of tires which, absent information relating to the vehicle specification, could be considered to be suitable for use on the vehicle. Accordingly, through use of the vehicle specification, it may be possible to select the most suitable tire which is appropriate for use on the vehicle 4. For example, it may be possible to select only tires which are capable of supporting a minimum weight, or which are suitable for driving at a given maximum speed. The vehicle specification may be obtained via any suitable means. For example, the vehicle specification may be stored on the electronic device 6 and be transmitted to the server 10. Alternatively, the vehicle specification may be stored on the server 10, and a vehicle identifier, which correlates the vehicle 4 to an associated specification, may be sent from the electronic device 6 to the server 10. Using the vehicle identifier, the server 10 may then obtain use the appropriate vehicle specification stored thereon.

As depicted in FIG. 10, in addition to selecting the tire for use on the vehicle, the method may also comprise step 225 of determining a predicted tire change point. This may be determined based on the positional data obtained in step 218. Additionally, whilst not depicted, other information may also be used in determining the predicted tire change point. For example, the road type driving profile determined in step 222, the damage factor and/or wear factor determined in step 264, the environmental conditions determined in step 266 may also be utilized in determining the predicted tire change point. Of course any other information which may impact the point at which the vehicle tires should be changed may also be taken into account. In the embodiments described above, the selected tire and/or the predicted tire change point may be displayed on the output terminal 16.

It will be appreciated any combination of the damage factor, wear factor, environmental conditions, locations and tire regulations, and the vehicle specification may be used in combination with the road type driving profile, when selecting the tire for use on the vehicle. Similarly, determination of such information may be performed in any appropriate order. Further, any of the methods described in respect of the embodiments above may be repeated for each of a plurality of vehicles 4 in a fleet of vehicles. A selection of the tire may then be made for each vehicle 4 in the fleet.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

Thus, although there have been described particular embodiments of the present invention of a new and useful TIRE SELECTION METHODS AND SYSTEMS it is not intended that such references be construed as limitations upon the scope of this invention except as set forth in the following claims.

What is claimed is:

1. A method, for determining a suitable tire for use on a vehicle, wherein the vehicle comprises an electronic device capable of collecting driving data relating to the driving of the vehicle, the method comprising:
   obtaining driving data, from the electronic device, relating to the driving of the vehicle;
   determining, from the driving data, an amount of driving performed on at least one of a plurality of different road types;

forming a road type driving profile comprising one or more road types of the plurality of different road types and the associated determined amount of driving performed thereon; and selecting, from a plurality of different tires, a suitable tire for the vehicle based on at least the road type driving profile, wherein the driving data comprises positional data and wherein the method further comprises determining, using the positional data, a damage factor which is indicative of the likelihood of potential damage to the tires on the vehicle and/or a wear factor which is indicative of expected wear to the tires on the vehicle, and wherein selecting a suitable tire for the vehicle is also based on the damage and/or wear factor.

2. The method according to claim 1, wherein the driving data comprises positional data relating to the driving of the vehicle, and wherein the method further comprises using the positional data to determine the amount of driving performed on at least one of the plurality of different road types.

3. The method according to claim 1, wherein selecting the suitable tire comprises selecting a tire from a tire database in which each of the plurality of tires is known for predominant use on one or more particular road types.

4. The method according to claim 1, wherein the driving data comprises positional data relating to the driving of the vehicle and wherein the method further comprises matching the positional data to map data, representing a road network and including a road type designation for each road segment in the road network, to determine the one or more road types driven on by the vehicle.

5. The method according to claim 1, wherein the step of determining the damage factor and/or the wear factor comprises using a damage and/or wear factor database comprising positional information and associated damage and/or wear factors, and matching the positional data to position information in the database to determine the damage and/or wear factors for the vehicle.

6. The method according to claim 1, wherein the driving data comprises positional data and wherein the method further comprises determining, using the positional data, environmental conditions in which the vehicle is driven, and wherein the selecting of the suitable tire for the vehicle is also based on the environmental conditions in which the vehicle is driven.

7. The method of claim 6, wherein determining the environmental conditions comprises using an environmental conditions database in which positional information and the associated environmental conditions are stored, and matching the positional data to the positional information to determine the environmental conditions experienced by the vehicle.

8. The method according to claim 1, wherein the driving data comprises positional data, and wherein the method comprises determining at least one location in which the vehicle is driven using the positional data and determining whether the at least one location has any tire regulations which specify the types of tires which must be used for said locations, and wherein selecting the tire suitable for use on the vehicle is also based on whether there are any tire regulations for the at least one location in which the vehicle is driven.

9. The method according to claim 1, wherein the vehicle comprises an associated vehicle specification and selecting of the suitable tire for use on the vehicle is also based on the vehicle specification.

10. The method according to claim 1, wherein the driving data comprises positional data, and the method further comprises determining, using the positional data, a predicted tire change point at which at least one tire on the vehicle should be replaced.

11. The method according to claim 1, wherein the driving data comprises further data relating to at least one of: the number of times the vehicle stopped, the average speed of the vehicle, acceleration of the vehicle, deceleration of the vehicle, brake usage, driving time and gear change data, and wherein the step of selecting of the suitable tire is also based on at least one of said further data.

12. The method according to claim 1, further comprising repeating the method for each of a plurality of vehicles.

13. The method according to claim 1, wherein the selecting of the tire comprises displaying the suitable tire on a display screen.

14. A system comprising a server, for determining the most suitable tire for use on a vehicle, the server comprising a processor and a tangible memory storing computer-executable instructions that, when executed by the processor, cause the server to:

obtain driving data relating to the driving of the vehicle;

determine from the driving data an amount of driving performed on at least one of a plurality of different road types, and form a road type driving profile comprising one or more road types of the plurality of different road types and the associated determined amount of driving performed thereon; and select, from a plurality of different tires, a suitable tire for the vehicle based on at least the road type driving profile, wherein the driving data comprises positional data and wherein the computer- executable instructions, when executed by the processor, further cause the server to further determine, using the positional data, a damage factor which is indicative of the likelihood of potential damage to the tires on the vehicle and/or a wear factor which is indicative of expected wear to the tires on the vehicle, and wherein the selecting a suitable tire for the vehicle is also based on the damage and/or wear factor.

15. The system of claim 14, further comprising an electronic device in a vehicle, wherein the electronic device is configured to collect driving data relating to the driving of the vehicle.

16. The system according to claim 15, wherein the electronic device is a telematics device.

17. The system of claim 14, further comprising an output terminal, comprising a display device, arranged to communicate with the server and display information relating to the road type driving profile and/or the selected tire for the vehicle.

18. A computer program product comprising computer-executable instructions embodied in a non-transitory computer readable medium which, when read by a machine, cause the machine to perform operations comprising:

obtaining driving data, from the electronic device, relating to the driving of the vehicle;

determining, from the driving data, an amount of driving performed on at least one of a plurality of different road types;

forming a road type driving profile comprising one or more road types of the plurality of different road types and the associated determined amount of driving performed thereon; and selecting, from a plurality of different tires, a suitable tire for the vehicle based on at least the road type driving profile, wherein the driving data comprises positional data, and wherein the computer-executable instructions embodied in the non-transitory computer readable medium which, when read by a machine, further cause the machine to determine, using the positional data, a damage factor which is indicative of the likelihood of potential damage to the tires on the vehicle and/or a wear factor which is indicative of expected wear to the tires on the vehicle, and wherein selecting a suitable tire for the vehicle is also based on the damage and/or wear factor.

* * * * *